(12) United States Patent
Shibagaki et al.

(10) Patent No.: US 7,278,151 B2
(45) Date of Patent: Oct. 2, 2007

(54) DISC CARTRIDGE

(75) Inventors: Susumu Shibagaki, Kanagawa (JP); Naoki Inoue, Kanagawa (JP); Yasuyuki Abe, Miyagi (JP)

(73) Assignee: Sony Corporation (JP)

( * ) Notice: Subject to any disclaimer, the term of this patent is extended or adjusted under 35 U.S.C. 154(b) by 569 days.

(21) Appl. No.: 10/737,635

(22) Filed: Dec. 16, 2003

(65) Prior Publication Data

US 2004/0210921 A1 Oct. 21, 2004

(30) Foreign Application Priority Data

Dec. 25, 2002 (JP) ............................. 2002-374444

(51) Int. Cl.
*G11B 23/03* (2006.01)
(52) U.S. Cl. ....................................... 720/741
(58) Field of Classification Search ................ 720/725, 720/738, 739, 741; 360/133
See application file for complete search history.

(56) References Cited

U.S. PATENT DOCUMENTS

| | | | |
|---|---|---|---|
| 6,356,527 B1 | 3/2002 | Shiomi et al. | 369/291 |
| 6,910,219 B2 * | 6/2005 | Okazawa et al. | 720/741 |
| 6,912,725 B2 * | 6/2005 | Oishi | 720/741 |
| 6,971,117 B2 * | 11/2005 | Okazawa et al. | 720/738 |
| 2001/0055270 A1 | 12/2001 | Obata et al. | 369/291 |
| 2003/0021061 A1 * | 1/2003 | Hall | 360/99.08 |
| 2003/0112738 A1 * | 6/2003 | Takizawa et al. | 369/291 |
| 2004/0163100 A1 * | 8/2004 | Kawaguchi et al. | 720/741 |
| 2004/0233797 A1 * | 11/2004 | Obata et al. | 369/30.03 |

FOREIGN PATENT DOCUMENTS

| | | |
|---|---|---|
| EP | 1156488 | 11/2001 |
| JP | 10-289551 | 10/1998 |
| JP | 2001-332055 | 11/2001 |
| JP | 2001-332057 | 11/2001 |
| JP | 2001-332058 | 11/2001 |
| JP | 2002-050149 | 2/2002 |

* cited by examiner

*Primary Examiner*—Angel Castro
(74) *Attorney, Agent, or Firm*—Lerner, David, Littenberg, Krumholz & Mentlik, LLP

(57) ABSTRACT

A disc cartridge consisting of an upper shell and a lower shell and an inner rotor rotatably arranged between them for housing an optical disc. The lower shell has a bottom opening that is opened and closed by shutter members, the optical disc is upwardly supported by its central part on a first pair of disc mount members that are formed near the periphery of the internal opening formed on the bottom of the inner rotor and by a second pair of disc mount members formed on the shutter members.

13 Claims, 24 Drawing Sheets

F I G. 1 5
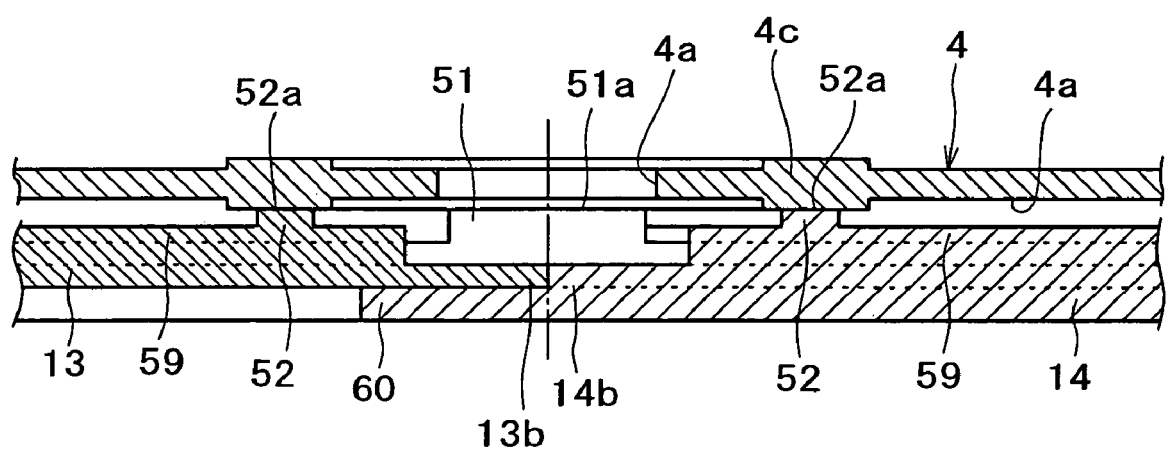

DISC CARTRIDGE

BACKGROUND OF THE INVENTION

1. Field of the Invention

The present invention relates to a disc cartridge to hold therein an optical disc (such as MO and DVD-ROM) or a similar disc-like recording medium.

2. Description of the Prior Art

For a greatly increased recording density through enhanced dust prevention, attempts have been made to develop a new disc cartridge with an inner rotor, as disclosed in the following patent literature.

Japanese Patent Laid-open No. 283556/2001 and its corresponding U.S. application, Ser. No. 09/82183

Japanese Patent Laid-open No. 332054/2001, its corresponding U.S. application, Ser. No. 09/858759, and its corresponding EP application, EP Publication No. 1156488

The disclosed disc cartridge has an inner rotor which is rotatably arranged between its upper and lower shells. On the bottom of the inner rotor is rotatably mounted an optical disc (such as MO and DVD), with its recording surface facing downward. The lower shell has a bottom opening (an elongated hole) to receive therein the optical pickup and the disk table of the spindle motor. In the bottom of the inner rotor is formed an internal opening of almost the same size and shape of the bottom opening. Between the lower shell and the bottom of the inner rotor are arranged two shutter members which, as the inner rotor rotates, open and close the opening in the bottom of the lower shell by their reciprocating movement between a first position at which the internal opening of the inner rotor coincides with the opening in the bottom of the lower shell and a second position which is displaced sideward from said first position.

Incidentally, at the center of the bottom of the inner rotor, there is a disc mount (semicircle or paired crescents in shape) which is formed integrally convex on the top of the periphery of the internal opening. On the disc mount is placed horizontally the center of an optical disc so that the recording surface (or the underside of the optical disc) floats above the bottom of the inner rotor while avoiding contact therewith. The inner rotor is driven by the following mechanism. The inner rotor has an integrally formed partial gear (to be driven) on its outer periphery. This gear is partly exposed in a window formed in one side of the disc cartridge. When the disc cartridge is loaded into a disc drive unit, the gear of the inner rotor engages with a driving rack of the disc drive unit. Thus the inner rotor is driven between the close position and the open position.

This disc cartridge is thin and holds therein an inner rotor and two shutter members (which are molded from plastics). Therefore, the two shutter members and the inner rotor are easily deformed inward when they are pressed inadvertently by the user's fingers while the opening at the bottom of the lower shell is closed by them. As the result of deformation, the two shutter members and the inner rotor come into contact with the recording surface (facing downward), thereby easily damaging data.

If a disc cartridge is to be made thin, it is necessary to reduce the height of the disc mount (shaped like a semicircle or paired crescents) on the inner rotor. This measure, however, results in the recording surface of the optical disc coming extremely close to the bottom of the inner rotor.

The above-mentioned disc mount shaped like a semicircle or paired crescents is so constructed as to permit the central part of an optical disc to be placed horizontally thereon. This disc mount, unlike the completely round disc mount on which the central part of an optical disc is placed horizontally, does not hold the central part of an optical disc by its entire periphery. Thus, the optical disc placed on the disc mount tends to incline toward an open part of the disc mount. The inclined disc causes its recording surface to come into contact with the bottom of the inner rotor, resulting in damage to data stored therein.

Meanwhile, the disc cartridge of two-head type for high-density recording, as disclosed in Japanese Patent Laid-open No. 332054/2001, is constructed such that the internal opening of the inner rotor is displaced sideward with respect to the opening in the bottom of the lower shell, and, when the disc cartridge is in its closed state (with the opening in the bottom of the lower shell closed by the two shutter members), the opening in the bottom of the inner rotor comes close to the window through which the inner rotor is driven, said window allowing the driven part opened in one side of the disc cartridge to be exposed. The above-mentioned disc cartridge in its closed state permits dust (together with the atmosphere) to get into the gap under the bottom of the inner rotor through the driving window of the inner rotor, with dust blowing up to the bottom of the inner rotor through the internal opening close to the driving window of the inner rotor, thereby sticking to the downwardly facing recording surface of the optical disc placed on the bottom of the inner rotor. Dust sticking to the recording surface of the optical disc causes spacing losses at the time of recording and reproduction. This is a serious drawback to high-density recording.

SUMMARY OF THE INVENTION

It is an object of the present invention to provide a disc cartridge which is so constructed as to protect the recording surface of the disc-like recording medium from the damage which might occur when the disc-like recording medium inclines in the disc cartridge or when the shutter and the inner rotor are pressed inward.

It is another object of the present invention to provide a disc cartridge which is so constructed as to prevent the easy entrance of dust into the disc cartridge through the gap under the inner rotor and the internal opening of the inner rotor from the driving window of the inner rotor which is partly exposed when the cartridge is in its closed state.

The present invention is directed to a disc cartridge so constructed as to rotatably house a disc-like recording medium, which comprises a shutter to open and close a bottom opening, a first disc mount which is formed inside the periphery of said bottom opening and on which is placed horizontally a part of the circumference of the approximately central part of said disc-like recording medium, and a second disc mount which is formed inside said shutter and on which is placed horizontally the other part of the circumference of the central part of said disc-like recording medium within said bottom opening when the shutter closes said bottom opening.

The present invention is directed also to a disc cartridge which comprises an upper shell, a lower shell having a bottom opening, an inner rotor which is capable of rotatably housing therein a disc-like recording medium and is rotatably arranged between said upper and lower shells and which has an internal opening which lies on the inside of said bottom opening when it is turned from the close position to the open position, a shutter which opens and closes said bottom opening in conjunction with said inner rotor as said inner rotor rotated between the close position and the open position, a first disc mount which is formed at the bottom of said inner rotor and in the vicinity of said internal opening and on which is placed horizontally a part of the circumference of the central part of said disc-like recording medium, and a second disc mount which is formed inside said shutter and on which is placed horizontally the other part of the central part of said disc-like recording medium when said shutter closes said bottom opening.

The present invention is directed also to a disc cartridge which comprises an upper shell, a lower shell having a bottom opening, an inner rotor which is capable of housing therein a disc-like recording medium and is rotatably housed between said upper and lower shells and which has an internal opening which lies on said bottom opening when it rotates from the close position to the open position, a shutter which is arranged between said inner rotor and said lower shell and which opens and closes said bottom opening as said inner rotor rotates between the close position and the opening position, and a rotation driving part which is formed on the periphery of said inner rotor and is driven for rotation by the driving member from the outside of said upper and lower shells, wherein said upper and lower shells have an inner rotor rotation driving window open to its side face so that a part of said rotation driving part is exposed to the outside from the side face of said upper and lower shells so that said rotation driving part is rotated and driven by said driving members, and have a labyrinth packing in the route through which dust enters from said inner rotor rotation driving window through the gap between the bottom of said inner rotor and said lower shell and the internal opening of said inner rotor.

The present invention is directed also to a disc cartridge so constructed as to rotatably house a disc-like recording medium, which comprises a shell with an opening, and paired shutter members to open and close said opening from both sides, said paired shutter members having a shutter reinforcing rib along the contact edge at which said paired shutter members come into contact with each other in said opening when said paired shutter members close said opening from both sides.

The present invention is directed also to a disc cartridge which comprises an upper shell, a lower shell with a bottom opening, an inner rotor which is capable of housing therein a disc-like recording medium and is rotatably arranged between said upper and lower shells, and paired shutter members to open and close said bottom opening from both sides by rotation of said inner rotor, said paired shutter members having a shutter reinforcing rib along the contact edge at which said paired shutter members come into contact with each other in said bottom opening when said paired shutter members close said bottom opening from both sides.

BRIEF DESCRIPTION OF THE DRAWINGS

FIG. 15 is an enlarged sectional view taken in the direction of the arrows along the line D—D in FIG. 13.

DESCRIPTION OF THE PREFERRED EMBODIMENTS

Figure 19:
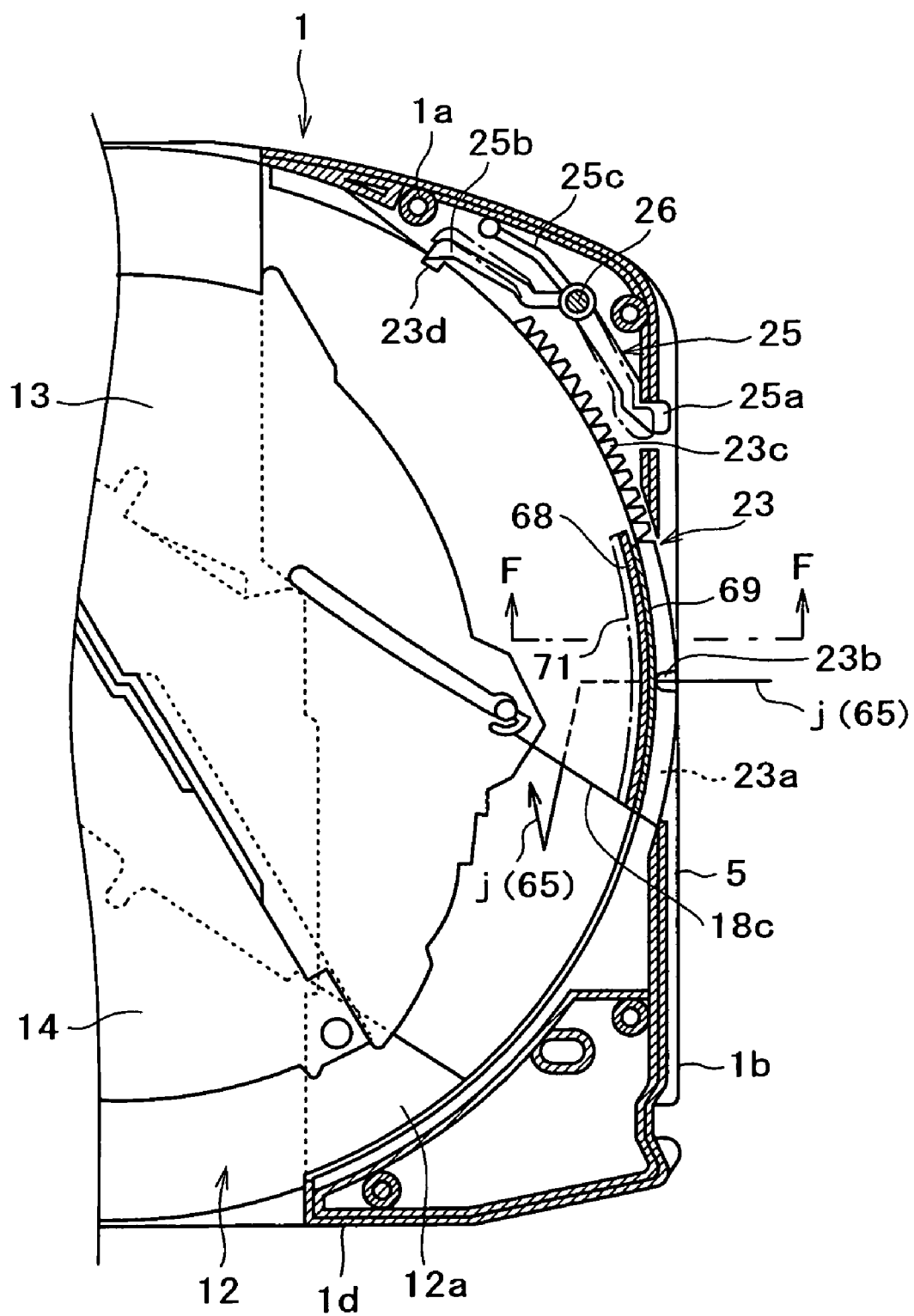
FIG. 19 is a cutaway plan view of the same disc cartridge as shown above, which is intended to explain the route through which dust enters the inner rotor from the driving window of the inner rotor.
Figure 20A:
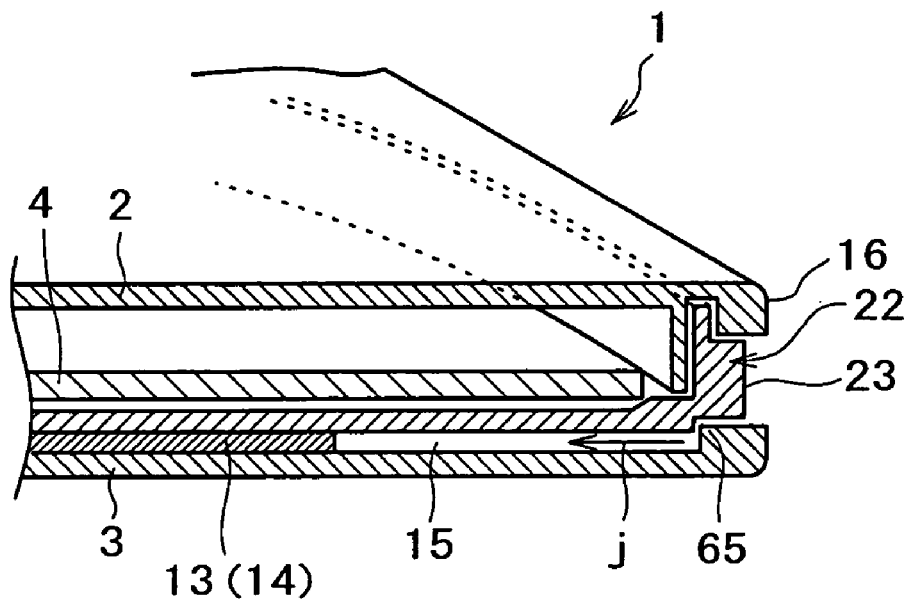
FIG. 20A is a sectional perspective view taken in the direction of the arrows along the line F—F in FIGS. 11 and 19, which is intended to explain the route through which dust enters the inner rotor.
Figure 23:
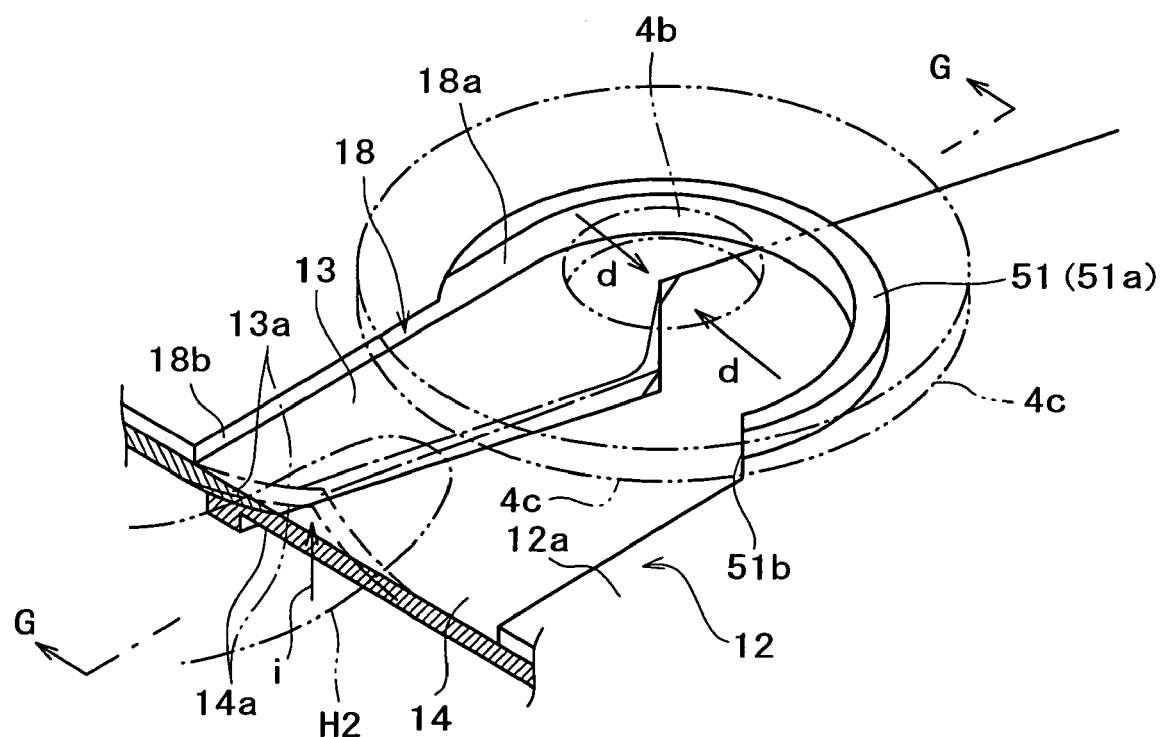
FIG. 23 is a perspective view of important parts which is intended to explain why the conventional disc cartridge permits the shutter to be easily pushed into the inner rotor.
Figure 24:
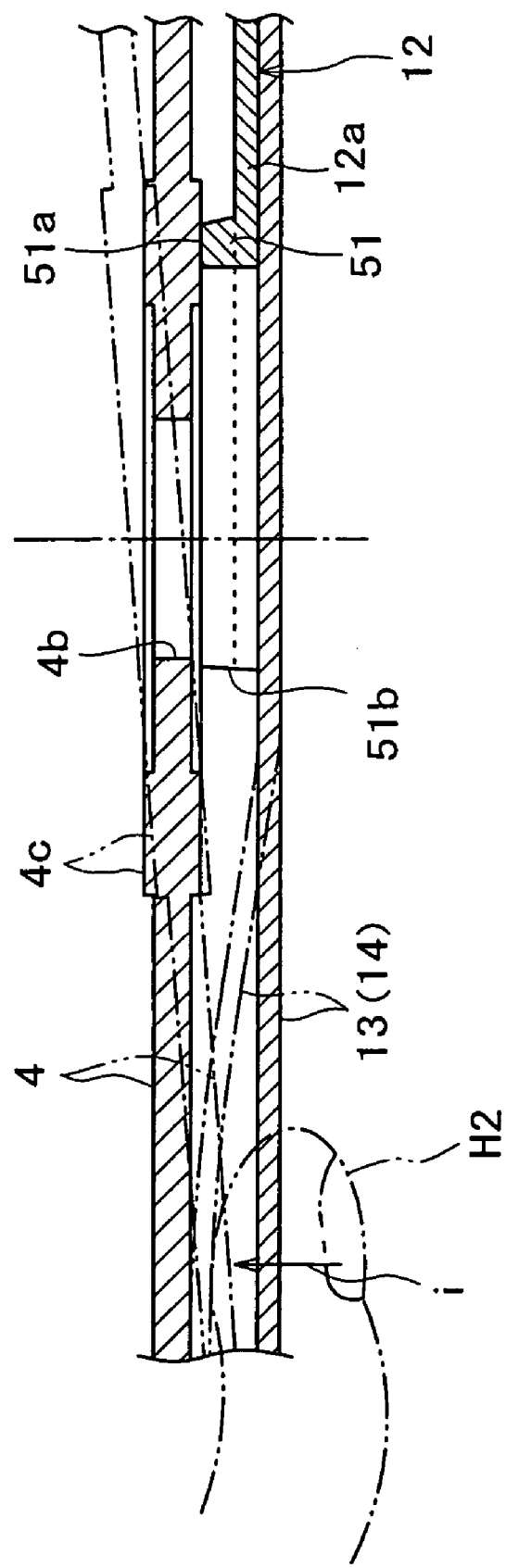
FIG. 24 is an enlarged sectional view taken in the direction of the arrows along the line G—G in FIG. 19 which is intended to explain why the conventional disc cartridge permits the optical disc to easily incline in the inner rotor or to be easily pushed into the inner rotor.

The preferred embodiments of the present invention will be described in the following order with reference to the accompanying drawings.
(1) The outline of the disc cartridge (FIGS. 1 to 10)
(2) The disc mount of the disc cartridge, according to the first embodiment (FIGS. 2 to 6, and 11 to 15)
(3) The disc mount of the disc cartridge, according to the second embodiment (FIGS. 17 and 18)
(4) The shutter reinforcing rib of the disc cartridge, according to the first embodiment (FIGS. 2 to 6 and 11 to 16)
(5) The shutter reinforcing rib of the disc cartridge, according to the second embodiment (FIGS. 17 and 18)
(6) The conventional disc mount and shutter of the disc cartridge, which are subject to deflection (FIGS. 19 and 20)
(7) The route through which dust enters from the driving window of the inner rotor of the disc cartridge (FIGS. 3, 11, 21, and 22)
(8) The labyrinth packing arranged in the route through which dust enters from the driving window of the inner rotor of the disc cartridge, according to the first embodiment (FIGS. 3, 11, 21, and 23)
(9) The labyrinth packing arranged in the route through which dust enters from the driving window of the inner rotor of the disc cartridge, according to the second embodiment (FIG. 24)

(1) The Outline of the Disc Cartridge

The outline of the disc cartridge of inner rotor type will be described first with reference to FIGS. 1 to 10. The disc cartridge 1 is a flat case consisting of an upper shell 2 and a lower shell 3 which are plastic moldings. It has a front end 1a forming an arc and a rear end 1d forming a trapezoid, which are joined by left and right parallel sides 1b and 1c. The disc cartridge 1 houses therein an optical disc 4 (such as MO and DVD as a disc-like recording medium), which is inserted horizontally in an inner rotor 12 (explained later), with its recording surface 4a facing downward. The disc cartridge 1 has on its one side 1b a rack inserting groove 5 which extends horizontally along the center of the thickness between the top and the bottom. The disc cartridge 1 also has on its other side 1c a concave part 6 (by which the cartridge is pulled in) at a position close to the front end 1a. The disc cartridge 1 also has a pair of holes (concave parts) 7a and 7b in the underside 1ethereof, one being round and the other being elliptic. These holes are close to the right and left sides, respectively, and also close to the rear end 1d. They serve to position the disc cartridge. The disc cartridge 1 also has a pair of square concave parts 8a and 8b on the top side if thereof. These concave parts are close to the right and left sides, respectively, and also close to the front end 1a. They serve to prevent the disc cartridge from rotating.

The disc cartridge also has a disc-like disc damper 9 (or chucking pulley) made of a magnetic material such as SUS. The disc damper 9 is arranged right above the central hole 4b of the optical disc 4. The disc damper 9 is held horizontal in the damper supporting ring 10 in such a way that it rotates and moves vertically. The disc clamper 9 is joined (by wielding or the like) to the underside of the upper shell 2.

In the disc cartridge 1 is rotatably housed a thin molded inner rotor 12. Under the inner rotor 12 are rotatably arranged horizontal a pair of thin molded shutters 13 and 14. The inner rotor 12 is a round dishlike object with a peripheral short wall 12b extending upward from the bottom 12a thereof. The inner rotor 12 is rotatably placed horizontal on the lower shell 3, with a gap 15 left between them, in such a way that the peripheral wall 12b of the inner rotor 12 rotatably fits into the downward cylindrical groove 16 formed inside the periphery of the upper shell 2.

The optical disc 4 is placed horizontal on the bottom 12a of the inner rotor 12 in such a way that it rotates and moves vertically. The inner rotor 12 is driven to rotate in the directions of a and b between the close position P1 and the open position P2 (mentioned later) within the disc cartridge 1.

The lower shell 3 constituting the underside 1e of the disc cartridge 1 has a bottom opening 17. The bottom 12a of the inner rotor 12 also has an internal opening 18 which has almost the same shape as the bottom opening 17. The bottom opening 17 and the internal opening 18 permit the spindle motor and the optical pickup (as the recording/reproducing head) to be inserted upward into the inner rotor 12 (as mentioned later).

The disc cartridge 1 is of two-head type. That is, it permits two optical pickups to be inserted simultaneously upward through the bottom opening 17 and the internal opening 18, so that the optical pickups scan the recording surface 4a (facing downward) of the optical disc 4 for recording and reading at two points on the diameter.

The bottom opening 17 of the lower shell 3 is composed of a central opening 17a and elongated front and rear openings 17b and 17c. The central opening 17a is formed at the center of the lower shell 3. The front and rear openings 17b and 17c extend nearly straight from both sides of the central opening 17a along the line which separates the lower shell 3 into right and left halves and connects the respective centers of the front and rear ends 1a and 1d of the disc cartridge 1. Like the bottom opening 17, the internal opening 18 of the inner rotor 12 is also composed of a central opening 18a and elongated front and rear openings 18b and 18c. The central opening 18a is formed at the center of the bottom 12a. The front and rear openings 18b and 18c extend nearly straight from both sides of the central opening 18a toward the peripheral wall 12b along the line which crosses the bottom 12a in its diametral direction.

Figure 10:
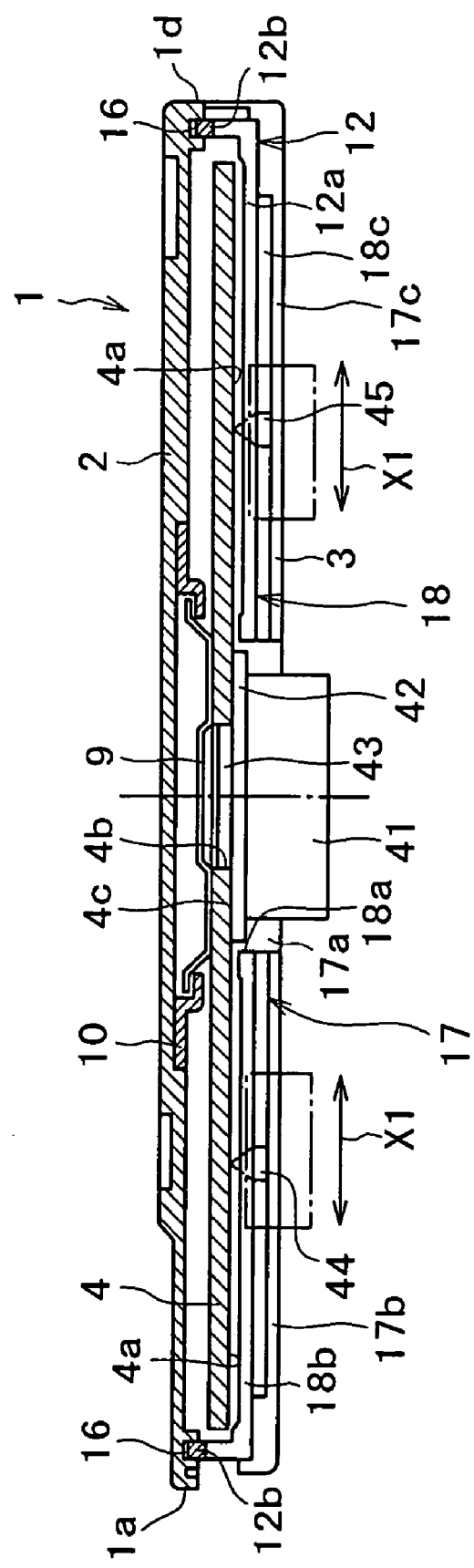
FIG. 10 is the same enlarged sectional view as FIG. 9, with the optical disc chucked by the spindle motor inserted into the bottom opening and with the two optical pickups inserted into the bottom opening.

As soon as the disc cartridge 1 is loaded into an optical disc drive, the disc table 42 of the spindle motor 41 is inserted upward into the central opening 17a of the bottom opening 17 and the central opening 18a of the internal opening 18. At the same time, the two optical pickups 44 and 45 are inserted simultaneously upward into the side openings 17b and 17c of the bottom opening 17 and the side openings 18b and 18c of the internal opening 18. These actions are illustrated in FIG. 10.

The paired shutters 13 and 14 are placed below the underside of the bottom 12a of the inner rotor 12. They are placed symmetrically and horizontally at both sides of the internal opening 18. Each of the paired shutters 13 and 14 has at its end a supporting pin 19 which is formed integrally with the underside of the bottom 12a, so that it rotates horizontally (along the underside of the bottom 12a) around the supporting pin 19. One supporting pin 19 is symmetrically opposite to the other supporting pin 19. There are a pair of cam grooves 20 which are formed symmetrically opposite with respect to the supporting points 19 of the paired shutters 13 and 14. These cam grooves 20 are slidably engaged with a pair of cam pins 21 which are formed integrally with the upper side of the lower shell 3. As the inner rotor 12 rotates, the paired shutters 13 and 14 are moved in the direction of arrow c or d to open or close the bottom opening 17 in its lateral direction.

The peripheral wall 12b of the inner rotor 12 has the rotation drive section 22 which is integrally formed over a certain range of an arc thereof. Part of this rotary drive section 22 is exposed through the long and narrow rotation drive window 23 of the inner rotor. This window is open approximately at the center in the lengthwise direction of the rack inserting groove 5 which is formed on one side 1b of the disc cartridge 1. As the rotary drive section 22 is driven (or turned) in the direction of a or b by the rack 31 through the rotary drive window 23 of the inner rotor, the paired shutters 13 and 14 open or close the bottom opening 17 of the lower shell 3.

The rotary drive section 22 of the inner rotor 12 consists of an arced convex part 22a, a rotation starting concave part 22b which is formed approximately at the center in the circumferential direction of the arced convex part 22a, a partial gear 22c formed in an arc which connects to the arced convex part 22a, and a rotation ending concave part 22d which is formed at the position a certain distance away from the partial gear 22c.

The disc cartridge 1 has the lock arm 25 (composed of molded parts) in the corner part 1h held between the front side 1a thereof and the lateral side 1b thereof. The lock arm 25 rotates in the direction of e or f around the supporting point 26 integrally formed on the bottom 3a of the lower shell 3. The lock arm 25 has the lock part 25b and the elastic part 25c which are integrally formed at the opposite side of the forward end 25a thereof, so that the forward end 25a goes in and out of the rack inserting groove 5 (in the direction of e or f) through the small window hole 27, which is closer to the front side 1a than the rotation driving window hole 23 of the inner rotor in the rack inserting groove 5.

The rack member 31 is also composed of molded parts; it has at its forward end 31a the rotation starting convex part 32 of the inner rotor which is integrally molded through the elastic arm 33. The elastic arm 33 has the rack 34 which is integrally formed. At the rear end 31b is the rotation ending convex part 35 of the inner rotor which is integrally formed through the elastic arm 36. Incidentally, the paired elastic arms 33 and 36 extend in the opposite directions.

When the inner rotor 12 of the disc cartridge 1 is turned in the direction of arrow a or b by the rack 31, the paired shutters 13 and 14 are opened or closed in the direction of arrow c or d, so that the opening 17 in the bottom of the lower shell 3 is opened and closed. This action is explained in the following.

Figure 1:
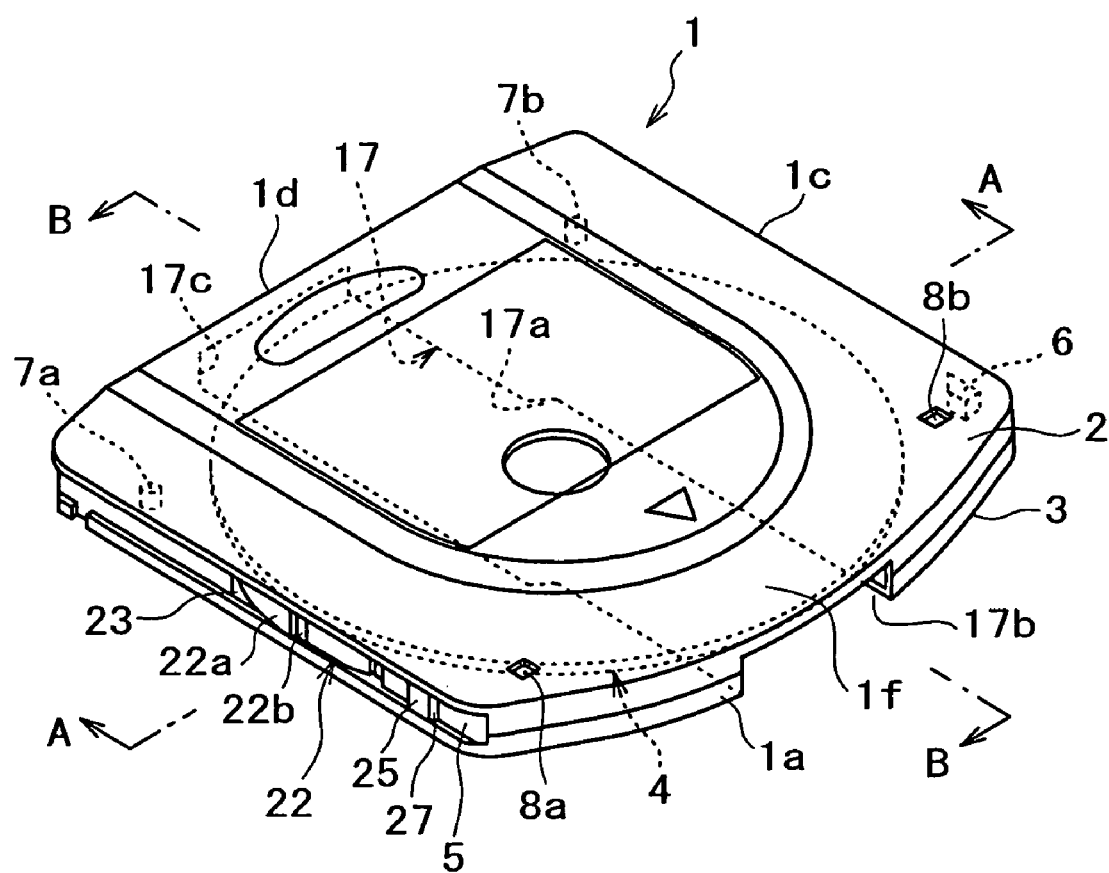
FIG. 1 is a full perspective view of the disc cartridge pertaining to the present invention.
Figure 2:
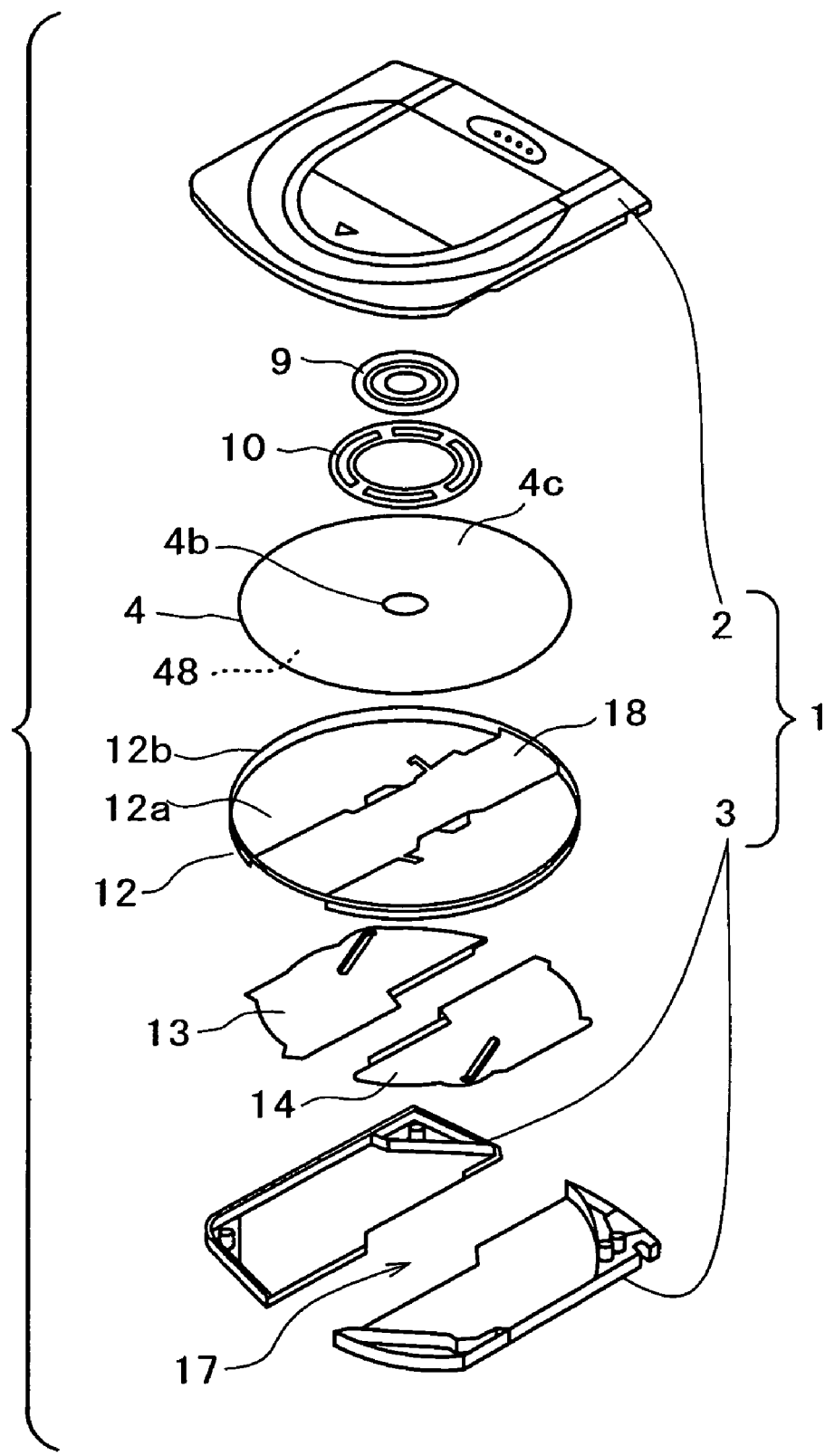
FIG. 2 is an exploded perspective view of the same disc cartridge as shown above.
Figure 3:
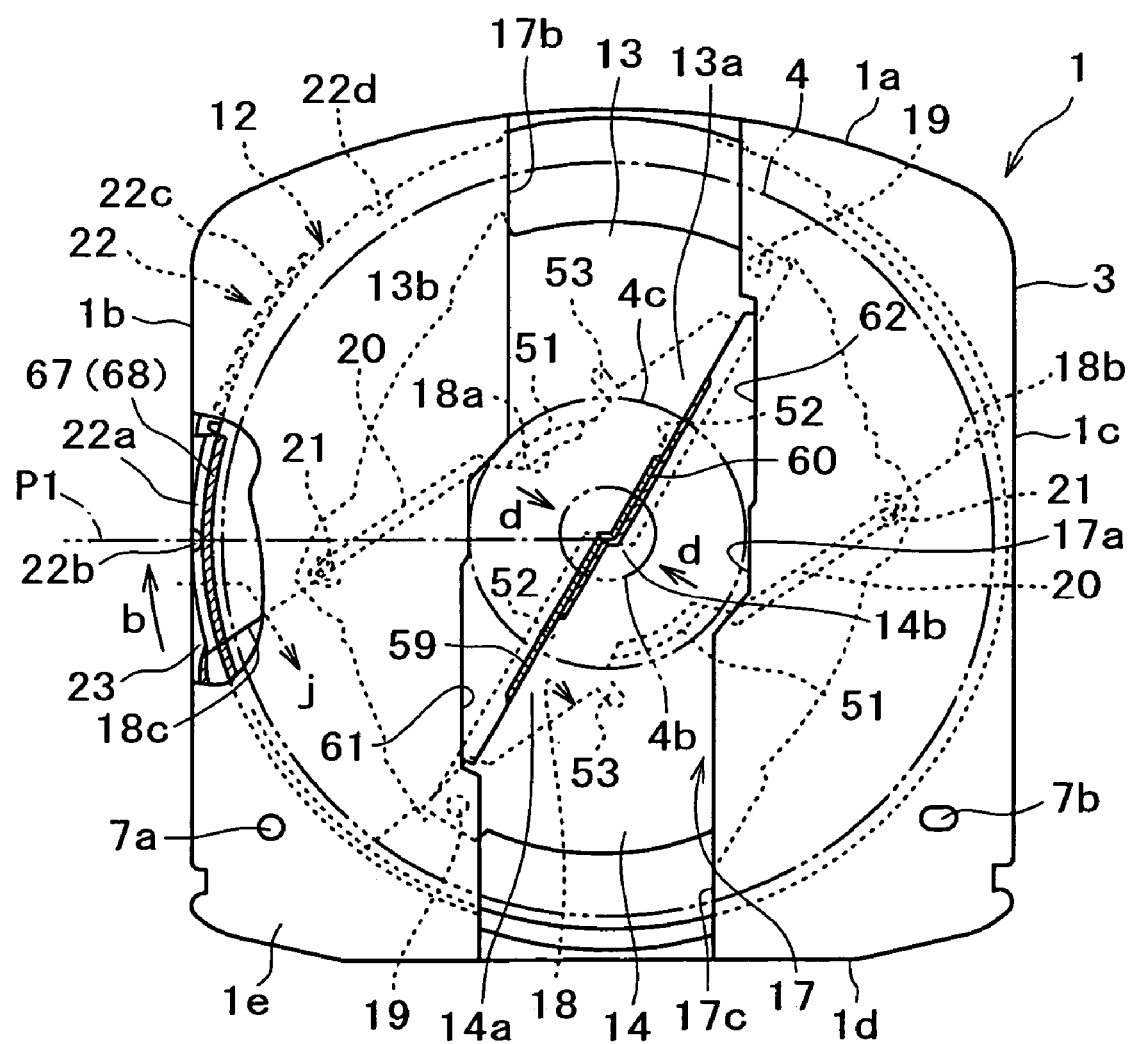
FIG. 3 is a partly cutaway bottom view of the same disc cartridge as shown above, with the bottom opening closed.
Figure 5:
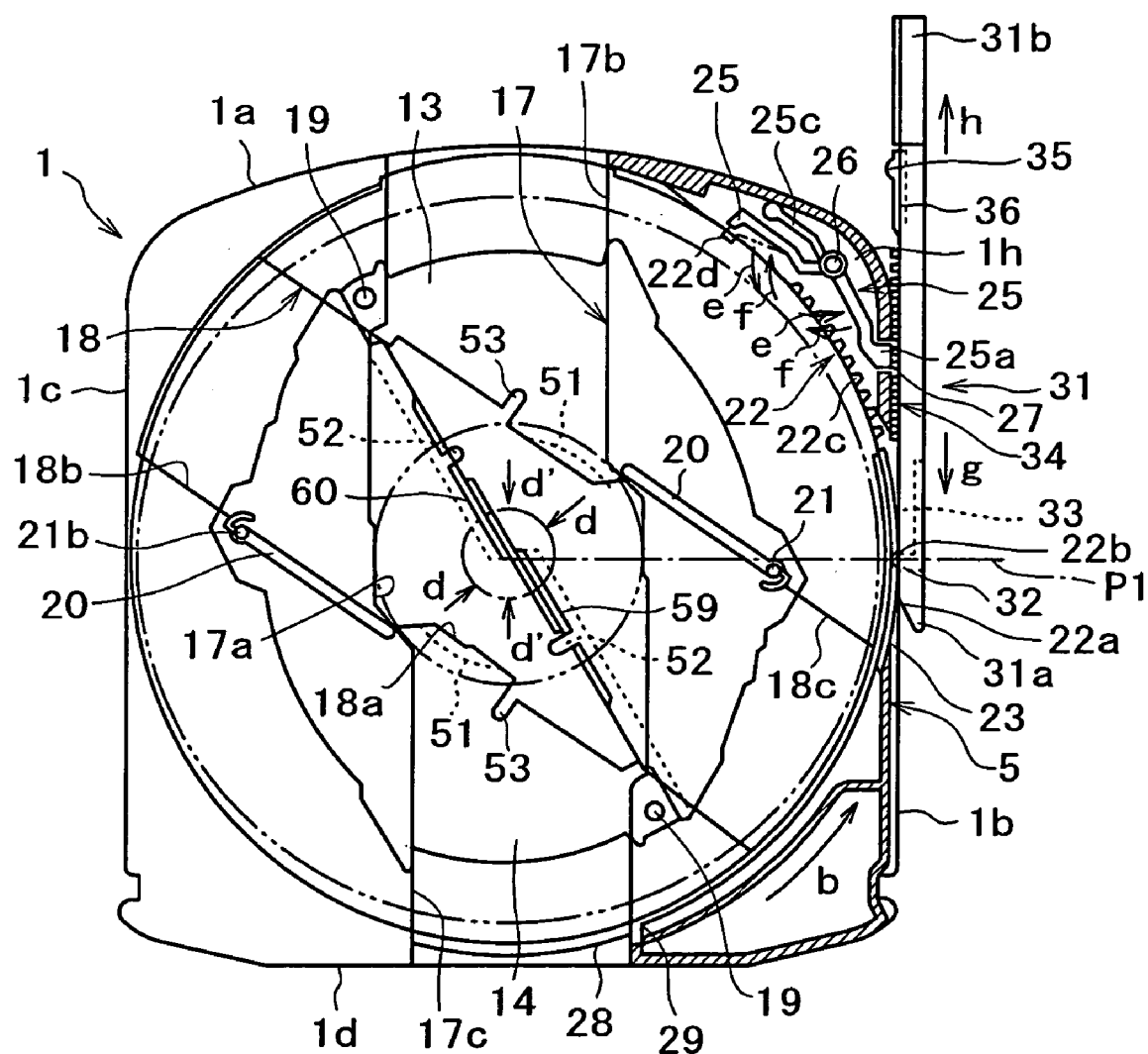
FIG. 5 is a partly cutaway plan view (seen through the top cover) of the same disc cartridge as shown above, with the bottom opening closed, which is intended to explain the structure of the driving mechanism of the inner rotor.

FIGS. 3 and 5 show the closed state of the opening 17 in the bottom of the disc cartridge 1. For closing, the inner rotor 12 rotates in the direction of arrow b and returns to the close position P1 and the internal opening 18 in the bottom 12a of the inner rotor 12 is displaced through a prescribed angle in the direction of arrow b around the center of the central openings 18a and 17a relative to the bottom opening 17. Thus, the paired shutters 13 and 14 are closed (toward each other) in the direction of arrow d. The peripheral part and peripheral wall 12b of the bottom 12a of the inner rotor 12 close the front and rear end parts of the openings 17b and 17c extending toward the front and rear sides of the bottom opening 17. At the same time, the paired shutters 13 and 14, which overlap with part of the bottom 12a of the inner rotor 12, close the central opening 17a of the bottom opening 17 and the central side part of the openings 17b and 17c extending toward the front and rear sides. In this way the bottom opening 17 is completely closed from the inside.

Incidentally, at this time, the arced convex part 22a and the rotation starting concave part 22b in the rotation driven part 22 of the inner rotor project into the rack inserting groove 5 from the rotation drive window 23 of the inner rotor at one lateral side 1b of the disc cartridge 1.

As shown in FIG. 5, the stopper 28, which is formed integrally with part of the periphery of the inner rotor 12, comes into contact with the stopper 29 in the direction of arrow b, which is integrally formed in the vicinity of one end of the bottom opening 17.

As indicated by the chain line in FIG. 5, the lock part 25b of the lock arm 25 engages (in the direction of arrow f) with the rotation ending concave part 22d in the periphery of the inner rotor 12 due to the elastic force of the elastic part 25c, so that the inner rotor 12 is locked at the close position P1 (becomes unable to move in either direction of arrow a or b) and the forward end 25a of the lock arm 25 projects (in the direction of arrow e) into the rack inserting groove 5 from the small window hole 27.

Figure 6:
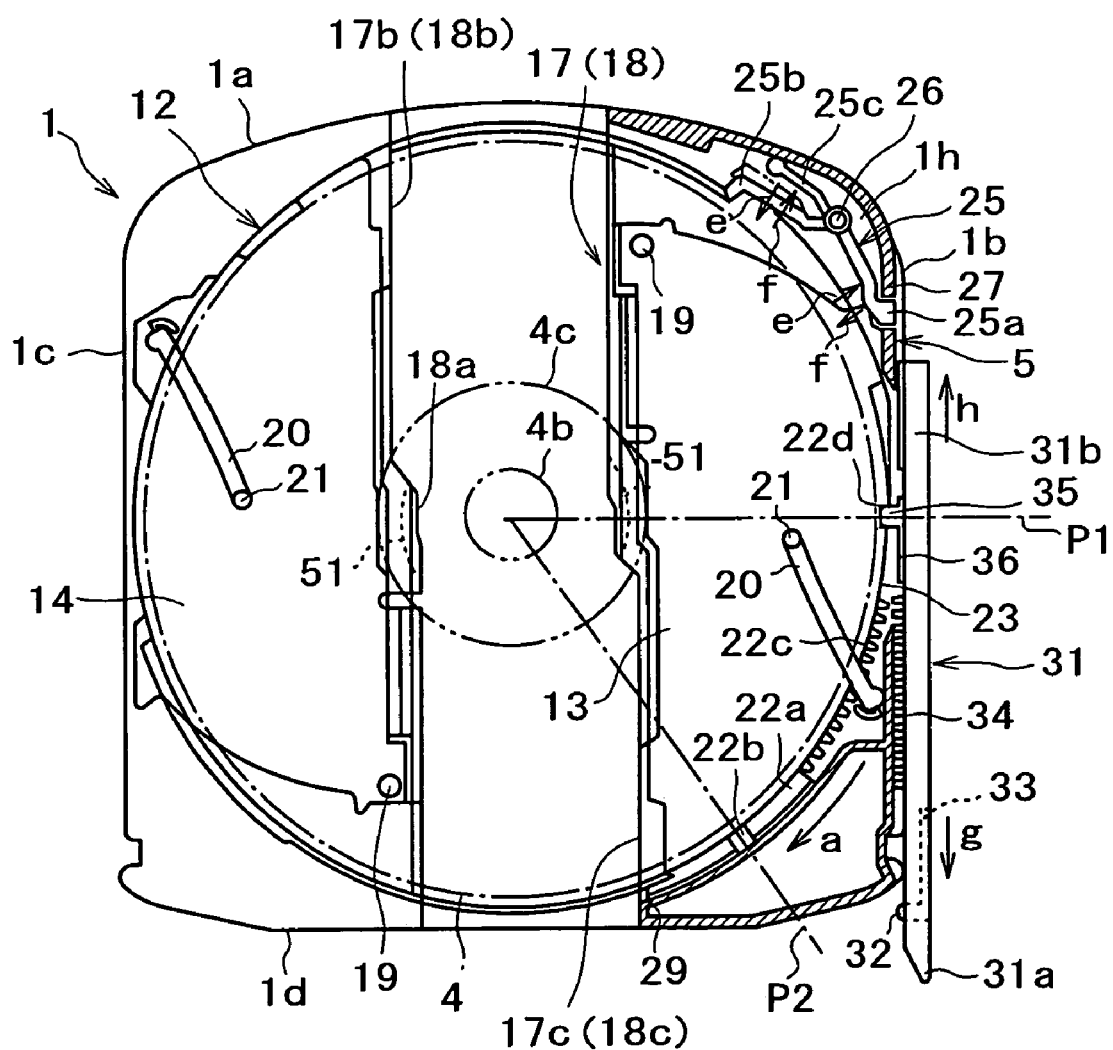
FIG. 6 is a partly cutaway plan view (seen through the upper shell) of the same disc cartridge as shown above, with the bottom opening opened, which is intended to explain the structure of the driving mechanism of the inner rotor.

Next, when the disc cartridge 1 is loaded into an optical drive unit, the rack member 31 moves relative to the disc cartridge 1, as shown in FIGS. 5 and 6. This movement causes the inner rotor rotation starting convex part 32 of the rack member 31, the rack 34, and the inner rotor rotation ending convex part 35 to be inserted sequentially (in the direction of arrow g) into the rack inserting groove 5 of the disc cartridge 1. They move along the rack inserting groove 5 in the direction of arrow g.

Then, first, the inner rotor rotation starting convex part 32 of the rack member 31 and the rack 34 push the forward end 25a of the lock arm 25 (in the direction of arrow f) against the elastic force of the elastic part 25c, as indicated by the solid line in FIG. 5, thereby causing the lock member 25b to be released (in the direction of arrow f) from the rotation ending concave part 22d of the inner rotor 12. Thus, this releases locking at the close position P1 of the inner rotor 12.

After that, the inner rotor rotation starting convex part 32 of the rack member 31 engages (against the elastic force of the elastic arm member 33) with the rotation starting concave part 22b approximately at the center of the arced convex part 22a in the rotation driven part 22 of the inner rotor 12, as shown in FIG. 5.

Then, the rack member 31 moves (in the direction of arrow g) along the rack member inserting groove 5 of the disc cartridge 1 from the position shown in FIG. 5 to the position shown in FIG. 6. During this movement, the inner rotor rotation starting convex part 32 turns and drives (in the direction of arrow a) the arced convex part 22a of the rotation driven part 22 of the inner rotor 12. Thus, the rack 34 of the rack member 31 engages with the partial gear 22c of the rotation driven part 22, and the rack 34 turns and drives the partial gear 22c in the direction of arrow a. This movement causes the inner rotor 12 to be continuously turned and driven (in the direction of arrow a) from the close position P1 shown in FIG. 5 to the open position P2 shown in FIG. 6.

After the inner rotor 12 has been turned to the open position P2, the inner rotor rotation ending convex part 35 of the rack member 31 engages with the rotation ending concave part 22d of the rotation driven part 22 by the elastic force of the elastic arm 36, as shown in FIG. 6. The end (facing in the direction of arrow a) of the arced convex part 22a comes into contact with (in the direction of arrow a) the stopper part 29 of the lower shell 3. Nearly at the same time, the lock part 25b of the lock arm 25 engages with the peripheral stopper part 28 of the inner rotor 12 by the elastic force of the elastic part 25c. In this way, the inner rotor 12 is locked at the open position P2.

Figure 4:
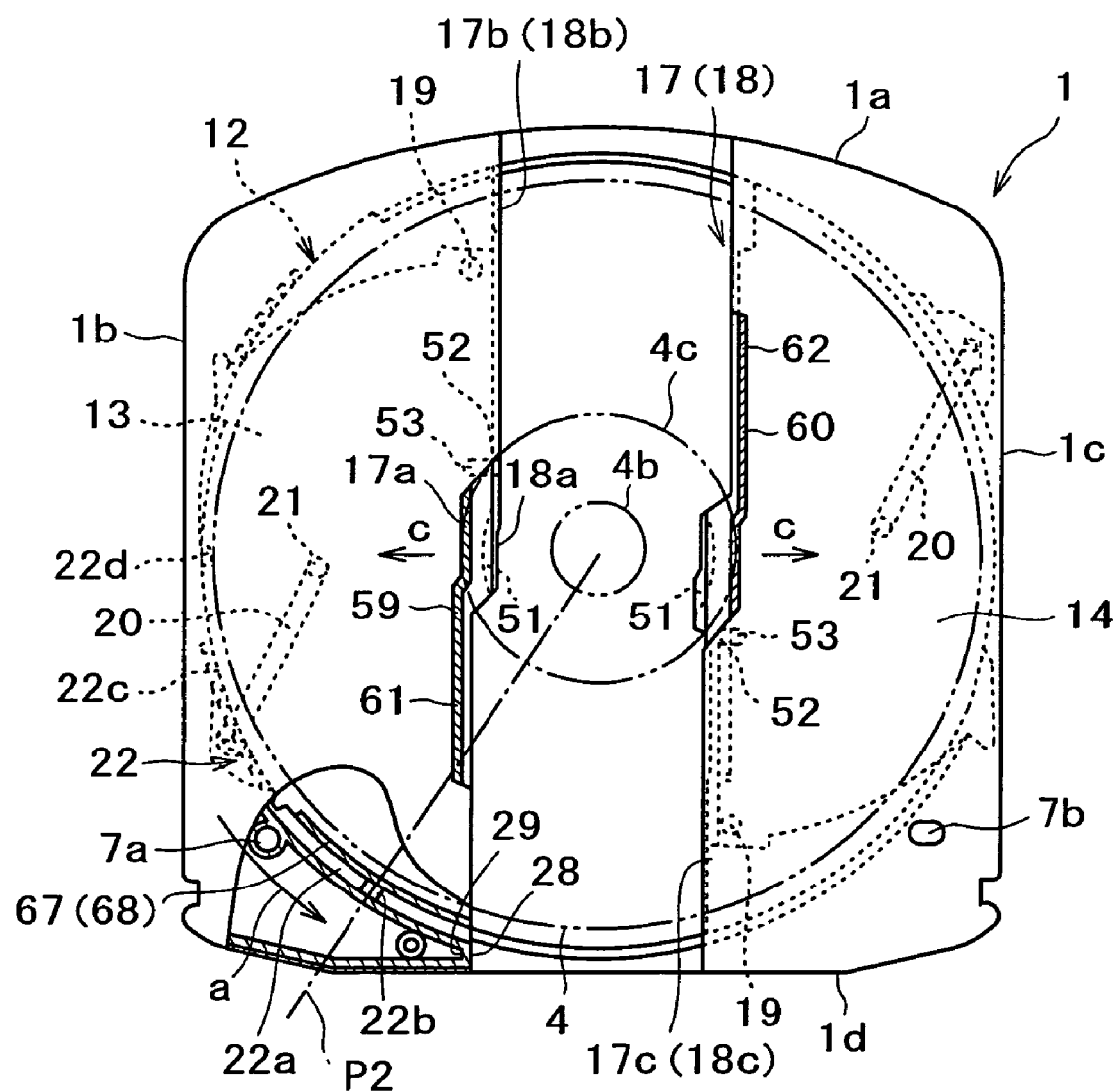
FIG. 4 is a partly cutaway bottom view of the same disc cartridge as shown above, with the bottom opening opened.

On the other hand, the inner rotor 12 is turned (in the direction of arrow a) from the close position P1 shown in FIG. 5 to the open position P2 shown in FIG. 6. This rotary movement places the internal opening 18 of the inner rotor 12 just above the bottom opening 17 of the lower shell 3, as shown in FIGS. 4 and 6. As the result, the paired rotary supporting points 19 of the paired shutters 13 and 14 are turned (in the direction of arrow a) from the close position P1 shown in FIGS. 3 and 5 to the open position P2 shown in FIGS. 4 and 6. Cam action takes place between the paired cam grooves 20 of the paired shutters 13 and 14 and the paired cam pins 21 of the lower shell 3. This cam action turns (in the direction of arrow a) the paired shutters 13 and 14 entirely. The paired shutters 13 and 14 are turned (in the direction of arrow c) around their respective rotary supporting points 19 to the open positions at both sides of the bottom opening 17 and the bottom opening 18. Thus, the bottom opening 17 of the lower shell 3 is completely opened. In other words, the bottom opening 17 is opened by cooperation between the inner rotor 12 and the paired shutters 13 and 14.

Incidentally, when the disc cartridge 1 is ejected from the optical disc drive unit, the rack member 31 moves relative to the disc cartridge 1 (in the direction of arrow h) along the rack member inserting groove 5 of the disc cartridge 1, as shown in FIGS. 5 and 6.

At this time, the inner rotor rotation ending convex part 35 of the rack member 31 drives the arced convex part 22a of the rotation driven part 22 of the inner rotor 12. As soon as the inner rotor 12 starts to turn in the direction of arrow b, the locking part 25b of the arm lock 25 turns (in the direction of arrow f) against the elastic force of the elastic part 25c. Thus, the locking part 25b is disengaged outward from the stopper part 28.

When, the rack 34 of the rack member 31 and the inner rotor rotation starting convex part 32 sequentially engage with the partial gear 22c of the rotation driven part 22 of the inner rotor 12 and the rotation starting concave par 22d, as shown in FIGS. 5 and 6, the rack member 31 turns and drives (in the direction of arrow b) the inner rotor 12 continuously from the open position P2 shown in FIG. 6 to the close position P1 shown in FIG. 5.

Then, a reverse action of opening the bottom opening 17 of the lower shell 3 takes place. That is, the internal opening 18 of the inner rotor 12 is displaced (in the direction of arrow b) over a prescribed angle toward the bottom opening 17 of the lower shell 3, as shown in FIGS. 3 and 5. At the same time, the paired shutters 13 and 14 close (in the direction of arrow d) from the open position to the close position. In this way, the bottom opening 17 is completely closed from the inside by the peripheral part of the bottom 12a of the inner rotor 12 and the paired shutters 13 and 14. In other words, the bottom opening 17 is closed by cooperation between the inner rotor 12 and the paired shutters 13 and 14.

After that, the rack member 31 is completely discharged (in the direction of arrow h shown in FIG. 5) from the rack member inserting groove 5 of the disc cartridge 1.

Figure 7:
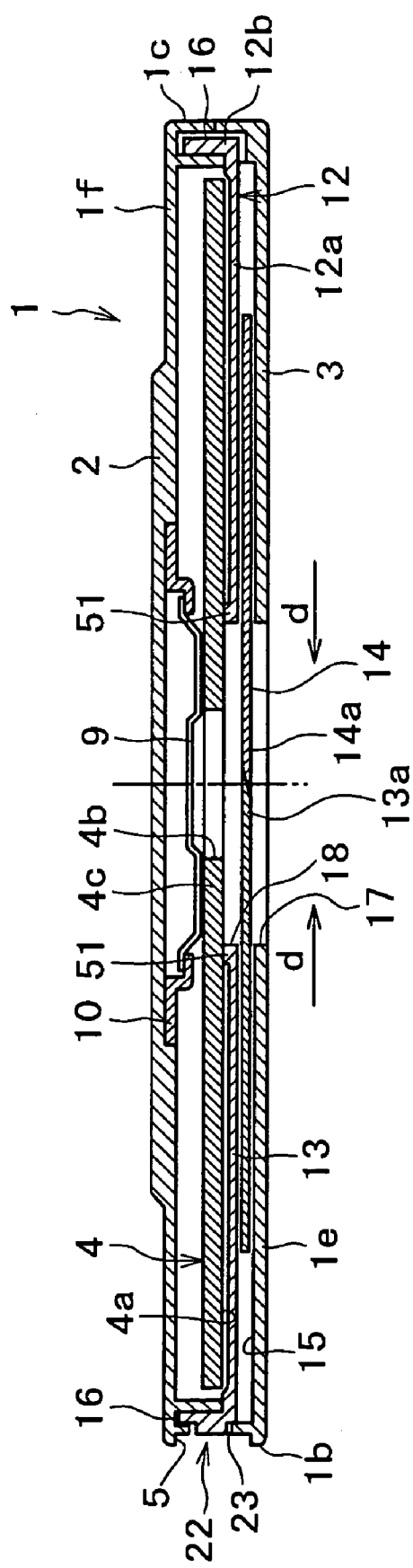
FIG. 7 is an enlarged sectional view taken in the direction of the arrows along the line A—A in FIG. 1.
Figure 9:
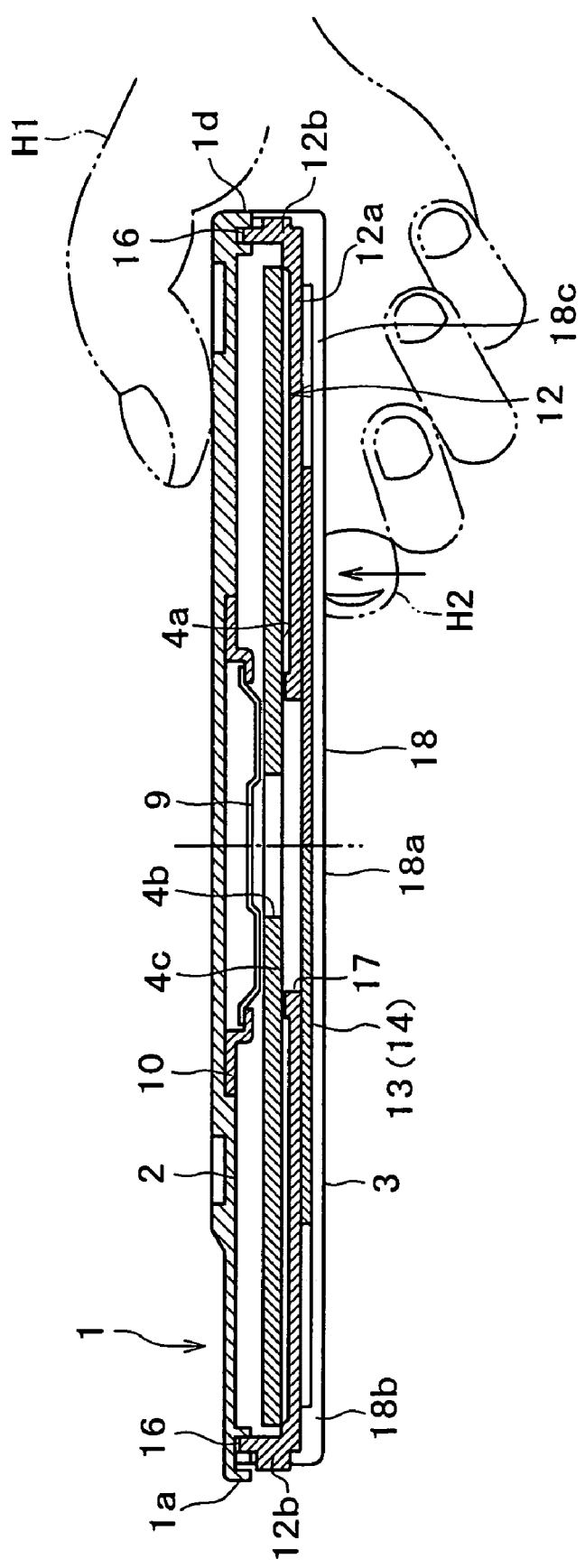
FIG. 9 is an enlarged sectional view taken in the direction of the arrows along the line B—B in FIG. 1.

Incidentally, the optical disc 4 in the disc cartridge 1 is horizontally held on the bottom 12a of the inner rotor 12, with its recording surface 4a facing downward, in such a way that it rotates and moves vertically, as shown in FIGS. 7 and 9.

Figure 8:
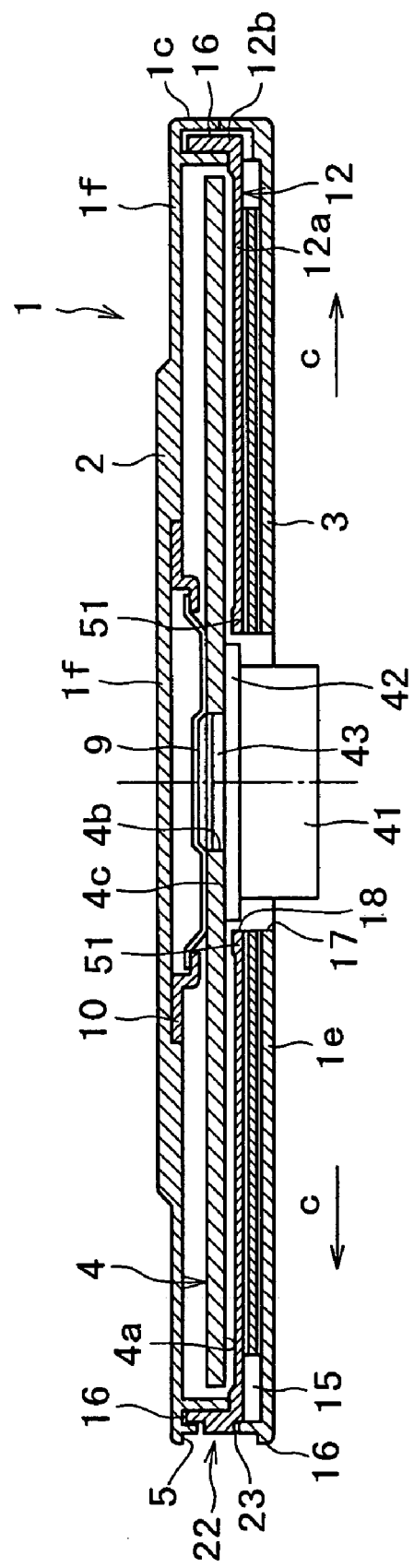
FIG. 8 is the same enlarged sectional view as FIG. 7, with the optical disc chucked by the spindle motor inserted into the bottom opening.

When the disc cartridge 1 loaded into an optical disc drive, the spindle motor 41 moves upward through the central opening 17a of bottom opening 17 and the central openings 18a of the internal opening 18, thereby causing the conical centering hub 43 on the disc table 42 thereof to fit into the central hole 4b of the optical disc 4, as shown in FIGS. 8 and 10. Thus, the disc table 42 pushes upward the optical disc 4 and disc clamper 9 above the bottom 12a of the inner rotor 12. At the same time, the chucking magnet (not shown) of the disc table 42 pulls downward the disc damper 9, thereby causing the optical disc 4 to be chucked horizontal on the disc table 42.

At this time, the optical pickups 44 and 45, which are of two-head type, move upward into the side openings 17b and 17c of the bottom opening 17 and the side openings 18b and 18c of the internal opening 18, as indicated by the chain line in FIG. 10.

The spindle motor 41 turns and drives the optical disc 4. The two optical pickups 44 and 45 (at two places arranged in the diametral direction) scan the recording surface 4a of the optical disc 4 in the radial directions X1 and X2 for seeking and tracking. (Scanning takes place simultaneously or selectively.) Thus the two optical pickups 44 and 45 perform data recording and reading simultaneously or selectively.

(2) The Disc Mount of the Disc Cartridge, According to the First Embodiment

According to the first embodiment, the disc cartridge 1 has the inner rotor 12 and the disc mount which is molded integrally with the paired shutters 13 and 14, as shown in FIGS. 3 to 6 and 11 to 18.

This disc mount supports from under the optical disc 4 (which is housed in the inner rotor 12) at the round central part 4c thereof at which the central hole 4b is formed, thereby preventing the recording surface 4a on the underside of the optical disc 4 from coming into contact with the bottom 12a of the inner rotor 12 and thus protecting data from damage.

The disc cartridge 1 is designed for the pickups of two-head type as mentioned above. The inner rotor 12 has the internal opening 18 formed in the bottom 12a thereof, and, as shown in FIG. 10, the internal opening 18 consists of the central opening 18a (into which the spindle motor 41 is inserted) and the elongated side openings 18b and 18c into which the two optical pickups 44 and 45 are inserted respectively.

Therefore, the central opening 18a does not form a completely round hole, with its sides remaining open. This makes it impossible to integrally form a completely round disc mount (which supports from under the central part 4c of the optical disc 4) on the bottom 12a of the inner rotor 12.

Consequently, the disc cartridge 1 has a first disc mount and a second disc mount. The first disc mount consists of a pair of disc mount members 51 which are integrally formed on (inside) the bottom 12a of the inner rotor 12 and at two places on the opposing peripheries of the central opening 18a in the internal opening 18. The paired disc mount members 51 for the first disc mount are formed symmetrically in a shape resembling a crescent.

The second disc mount consists of a pair of disc mount members 52, which are integrally formed on (inside) the edges 13a and 14a which come into contact with each other when the shutter (consisting of the paired shutter members 13 and 14) is closed in the direction of arrow d. The paired disc mount members 52 for the second disc mount are formed symmetrically in a shape resembling an arc. They are at two positions on the line perpendicular to the opposing direction of the paired disc mounting members 51 for the first disc mount and also on the same circumference of the paired disc mount members 51 for the first disc mount.

Figure 14:
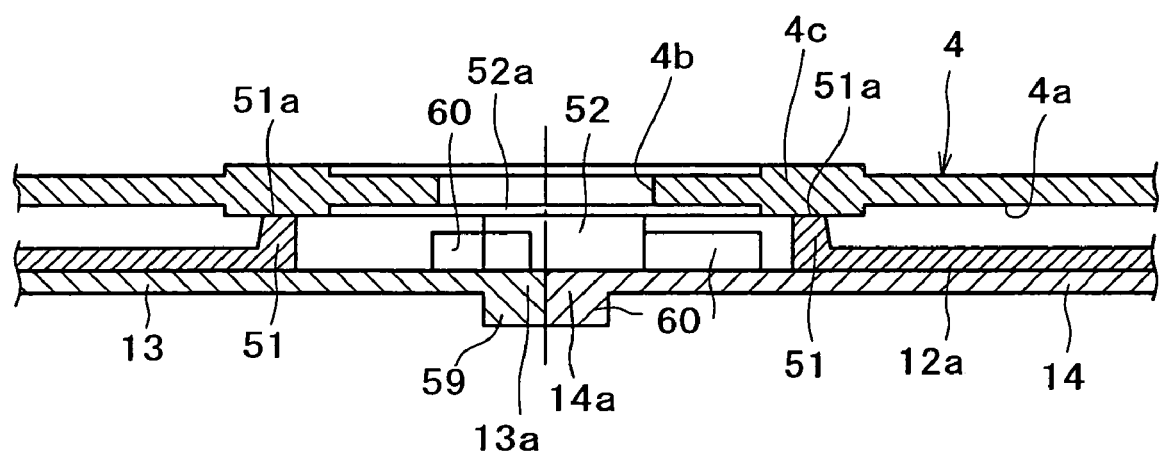
FIG. 14 is an enlarged sectional view taken in the direction of the arrows along the line C—C in FIG. 13.

Incidentally, these disc mount members 51 and 52 for the first and second disc mounts are arranged such that their upper surfaces 51a and 52b are at the same horizontal level, as shown in FIGS. 14 and 15.

Figure 11:
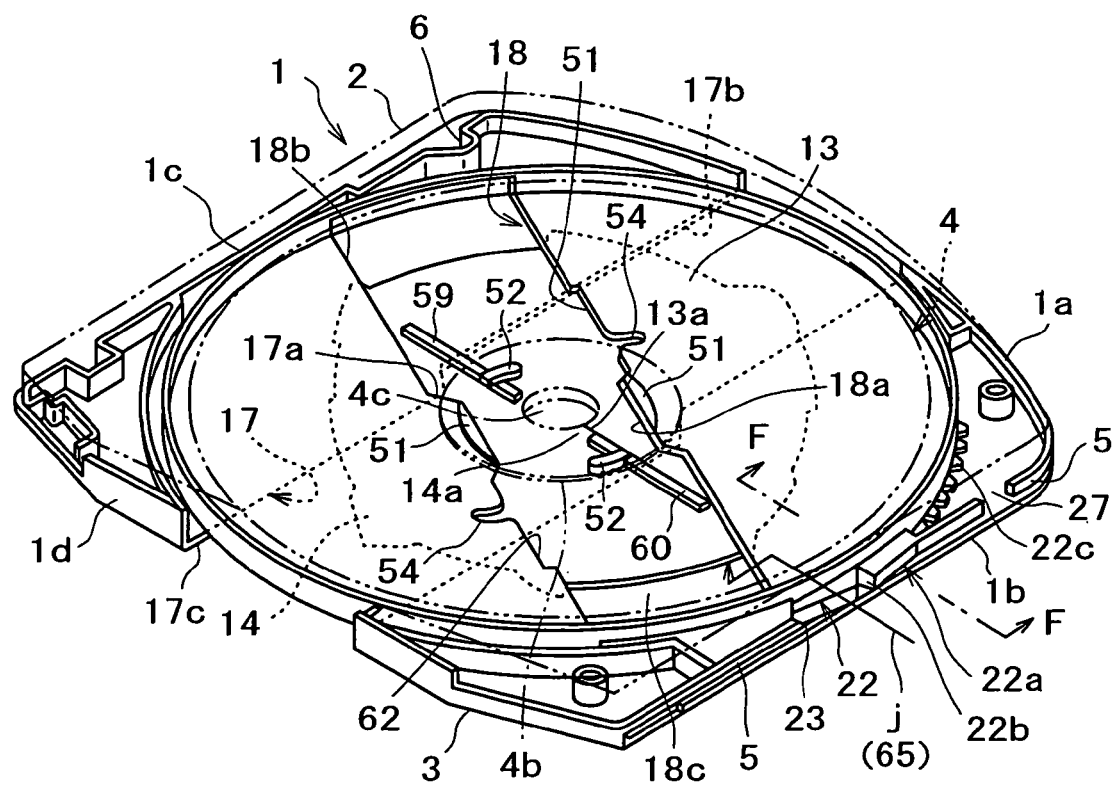
FIG. 11 is a perspective view of the inner rotor and the lower shell of the same disc cartridge as shown above.

The paired disc mount members 52 for the second disc mount constitute the movable disc mount which moves (in the direction of arrows c and d relative to the inner rotor 12) together with the paired shutter members 13 and 14 when they open and close in the directions of arrows c and d. As shown in FIGS. 3, 5, and 11, when the paired shutter members 13 and 14 close to the close position in the direction of arrow d, the paired disc mount members 52 for the second disc mount move to the two positions in the direction approximately perpendicular to the opposing direction of the paired disc mount members 51 for the first disc mount. Also, as shown in FIGS. 4 and 6, when the paired shutters 13 and 14 open to the open position in the direction of arrow c, the paired disc mount members 52 for the second disc mount come into the paired arced notches 53 which are formed in part of the both edges 18d in the widthwise direction of the both side openings 18b and 18c of the internal opening 18 in the bottom 12a of the inner rotor 12.

The disc mount of the disc cartridge 1, which is constructed as mentioned above according to this embodiment, has the following advantage. The central opening 18a in the internal opening 18 of the inner rotor 12 on the bottom of which the optical disc 3 is placed horizontal is not a round hole but has side openings 18b and 18c connected to the front and rear sides thereof. Despite this structure, as shown in FIGS. 11 and 13 to 15, as the paired shutters 13 and 14 close, the paired disc mount members 51 for the first disc mount of the bottom 12a of the inner rotor 12 and the paired disc mount members 52 for the second disc mount which are the movable disc mount on the paired shutter members 13 and 14 come close at approximately quartered positions on the same circumference around the central opening 18a of the internal opening 18. Moreover, the four disc mount members 51 and 52, which have come close together, keep all of their upper end surfaces 51a and 52a horizontal.

Consequently, when the optical disk 4 is placed horizontal on the bottom 12a of the inner rotor 12, it is possible to place the flat lower surface 4d of the round central part 4c, in which the central hole 4b of the optical disc 4 is formed, horizontal very stably on the upper ends 51a and 52a of the four disc mount members 51 and 52. As the result, a stable gap 54 is formed between the bottom 12a of the inner rotor 12 and the recording surface 4a (facing downward) at the outer periphery of the central part 4c of the optical disc 4.

By stably supporting upward at the approximately quartered positions in the circumferential direction in the lower surface 4d of the central part 4c of the optical disc 4 with the four disc mount members 51 and 52, it is possible to prevent the optical disc 4 from inclining in all the directions (360°) in the inner rotor 12 and hence it is possible to prevent the recording surface 104 from coming into contact with the bottom 12a of the inner rotor 12 by inclination, thereby protecting data from damage.

Also, the disc cartridge 1 according to this embodiment is constructed such that the bottom opening 17 of the lower shell 3 is opened to the front and rear ends of the lower shell 3. Therefore, as indicated by the chain line in FIG. 9, when the disc cartridge 1 is loaded into or ejected from an optical drive unit by holding it (with its shutter closed) from above and below with a hand H1, there is a possibility that the bottom opening 17 is inadvertently pushed inside by the index finger H2, with the result that both or either of the thin shutter members 13 and 14 is deflected upward (in the direction of arrow i) by the index finger H2.

However, either of the shutter members 13 and 14 has the disc mount members 52 for the second disc mount which are integrally formed thereon; therefore, when the shutter members 13 and 14 are pushed upward, the disc mount members 52 for the second disc mount push upward (in the direction of arrow i) the lower face 4d of the central part 4c of the optical disc 4, thereby allowing the recording surface 4a of the optical disc 4 to automatically escape upward from the paired shutter members 13 and 14. In this way, it is possible to avoid the situation in which the shutter members 13 and 14, which have been pushed upward (in the direction of arrow i), come into contact with the recording surface 4a of the optical disc 4, thereby damaging data.

Also, the paired disc mount members 52 for the second disc mount are so constructed as to fit into the paired notches 53, which are formed in both edges 18d of the internal opening 18 at the bottom of the inner rotor 12, when the paired shutter members 13 and 14 open in the direction of arrow c, as shown in FIGS. 4 and 6. This construction prevents the open stroke (in the direction of arrow c) of the paired shutter members 13 and 14 from being restricted by the paired disc mount members 52.

In other words, the opening-closing stroke of the paired shutter members 13 and 14 can be made large, and the internal opening 18 of the inner rotor 12 can be made sufficiently large and the groove of the bottom opening 17 of the lower shell 3 can be made sufficiently wide (in the direction perpendicular to the lengthwise direction).

(3) The Disc Mount of the Disc Cartridge, According to the Second Embodiment

Figure 17:
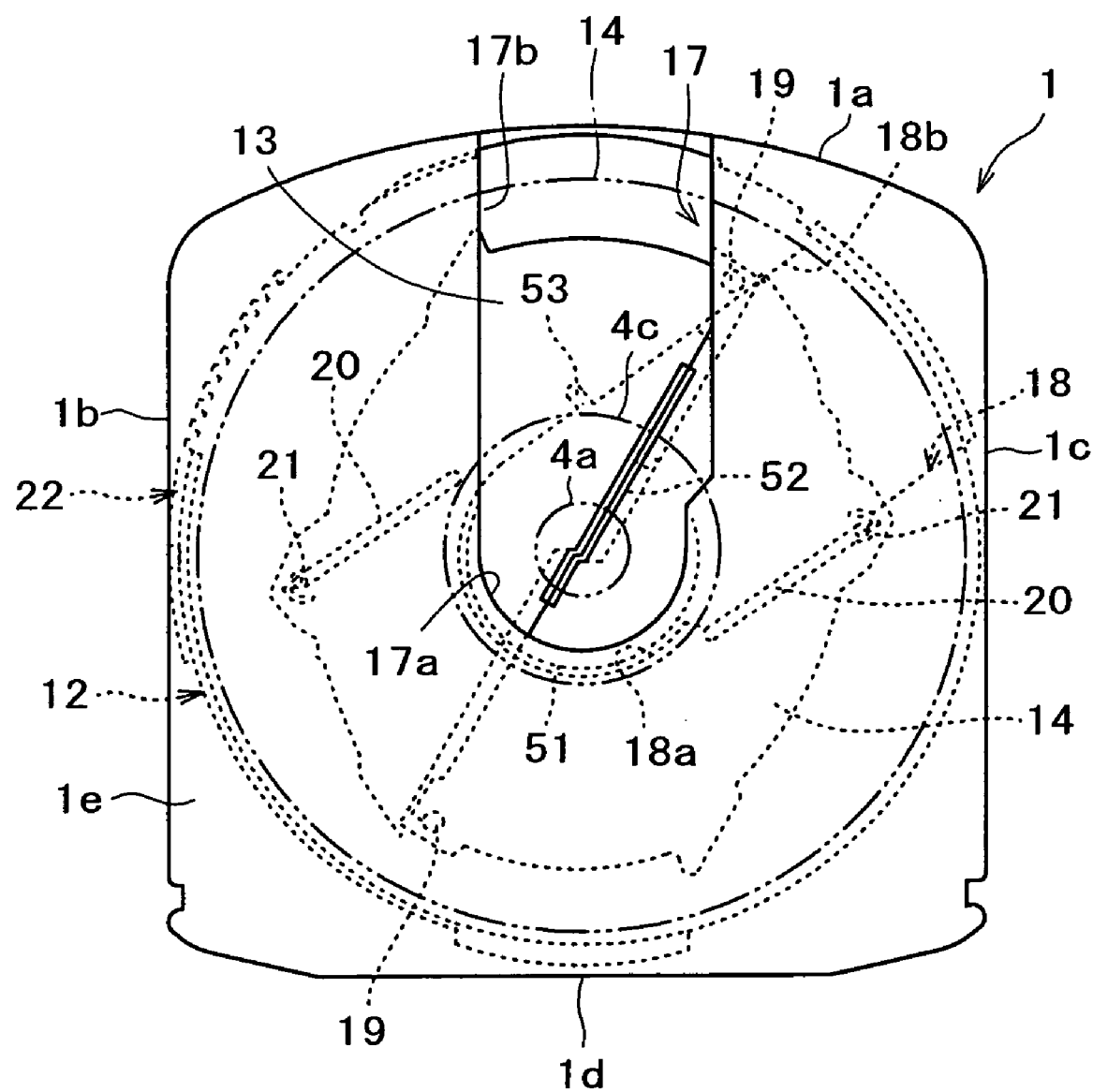
FIG. 17 is an enlarged sectional view showing the first and second disc mounts and the shutter reinforcing rib of the same disc cartridge as shown above. (The second embodiment)
Figure 18:
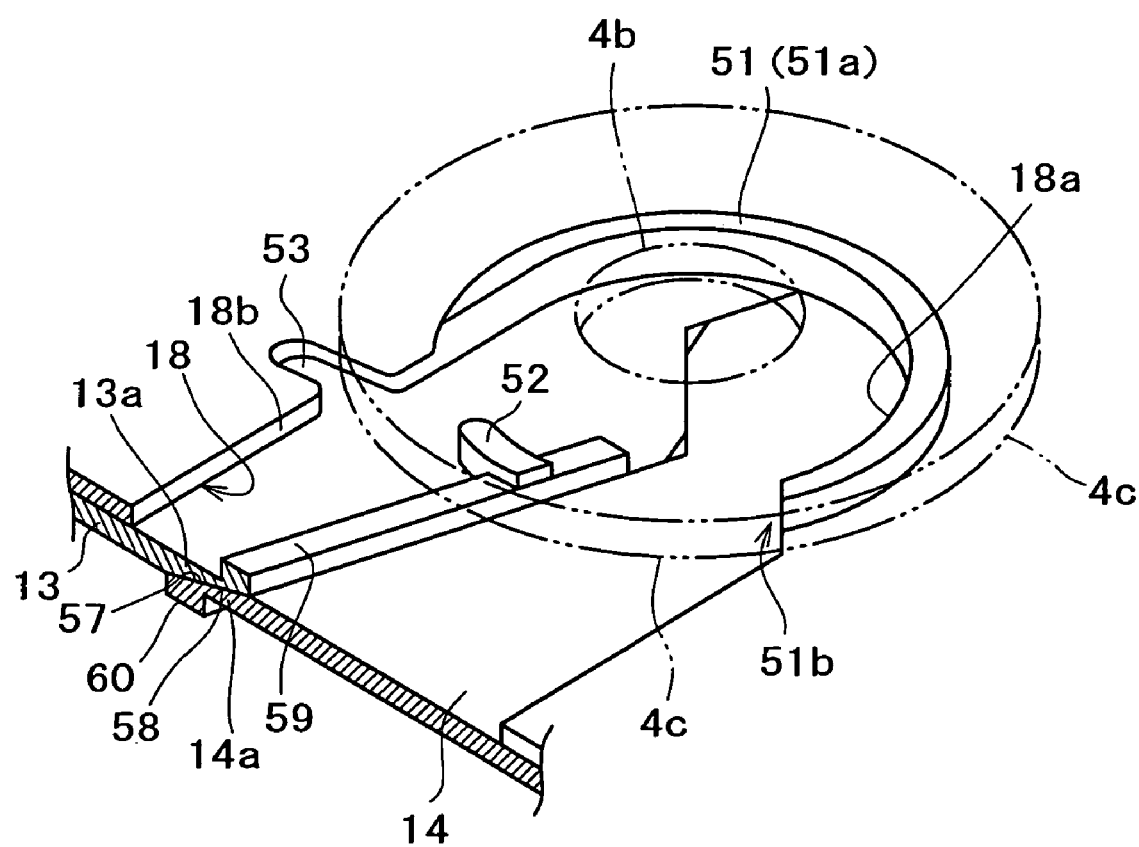
FIG. 18 is an enlarged sectional view of the important parts in FIG. 17.

The disc mount according to the second embodiment is formed integrally with the inner rotor 12 and the shutter 12 in the disc cartridge 1, as shown in FIGS. 17 and 18.

This disc cartridge 1 is of one-head type, which employs one optical pickup to perform recording/reading on the optical disc 4. The disc cartridge of this type is characterized in that the bottom opening 17 of the lower shell 3 and the internal opening 18 of the inner rotor 12 have a U-shape which consists of approximately semicircular central openings 17a and 18a and the side openings 17b and 18b extending from the end thereof.

The first disc mount 51 is integrally formed approximately round above (inside) the bottom 12a of the inner rotor 12 and along the periphery of the central opening 18a. The second disc mount 52 is integrally formed in an approximately arced shape either above (or inside) or both above (and inside) the contacting edges 13a and 14a of the paired shutter members 13 and 14. Thus, when the paired shutter members 13 and 14 close toward each other in the direction of arrow d, the second disc mount 52 is arranged such that it is above approximately the same circumference of the first disc mount 51 and approximately at the center of the open part 51b of the first disc mount 51.

Incidentally, on either or both of the edges 18b of the side opening 18b of the internal opening 18 of the inner rotor 12 is formed the notch 53 into which the second disc mount 52 fits when the shutter is opened.

Therefore, in this case, too, it is possible to stably and horizontally mount the lower surface 4d of the circular central part 4c of the optical disc 4 on the horizontal upper end surfaces 51a and 52b of the first approximately round disc mount 51 and the second approximately arced disc mount 52 arranged approximately near the center of the open part thereof.

Also, as in the disc mount according to the first embodiment mentioned above, the approximately entire circumference of the central part 4c of the optical disc 4 is stably supported upward by the first and second disc mounts 51 and 52; therefore, it is possible to prevent the optical disc 4 from inclining all directions (360°) within the inner rotor 12. Thus, the disc mount according to the second embodiment has the same advantage as the disc mount according to the first embodiment mentioned above.

Consequently, the disc mount constructed as mentioned above according to the first and second embodiments may be applied to an MD (minidisk) cartridge, in which the paired (upper and lower) first disc mounts 51 are formed approximately semicircular inside the paired (upper and lower) U-shaped openings of the upper and lower shells, and the movable paired (upper and lower) second disc mounts 52 are formed in an arced shape on a part of the paired (upper and lower) insides of the sliding shutters made of metal or the like. Thus, in the same way as in the second embodiment mentioned above, it is possible to stably support over the almost entire circumference above and below the central part of the MD by the first and second disc mounts 51 and 52.

(4) The Shutter Reinforcing Rib of the Disc Cartridge, According to the First Embodiment The disc cartridge 1 according to the first embodiment is characterized in that the paired shutter members 13 and 14 have a shutter reinforcing rib formed integrally therewith, as explained below with reference to FIGS. 2 to 6 and 11 to 16.

As mentioned above, the paired shutter members 13 and 14 in the disc cartridge 1 are constructed of thin molded parts and hence they are poor in stiffness.

They are constructed such that when the bottom opening 17 of the disc cartridge 1 is closed, the paired shutter members 13 and 14 move toward each other in the direction of arrow d from both sides of the bottom opening 17, as shown in FIGS. 3 and 11. In this state, the edges 13a and 14a at which the paired shutters 13 and 14 come into contact with each other in the direction of arrow d cross aslant with a long span from the center of the central opening 17a of the bottom opening 17 to the side openings 17b and 17c.

Therefore, the contact edges 13a and 14a of the shutter members 13 and 14, among others, are poor in stiffness and easily liable to flexure.

Figure 12:
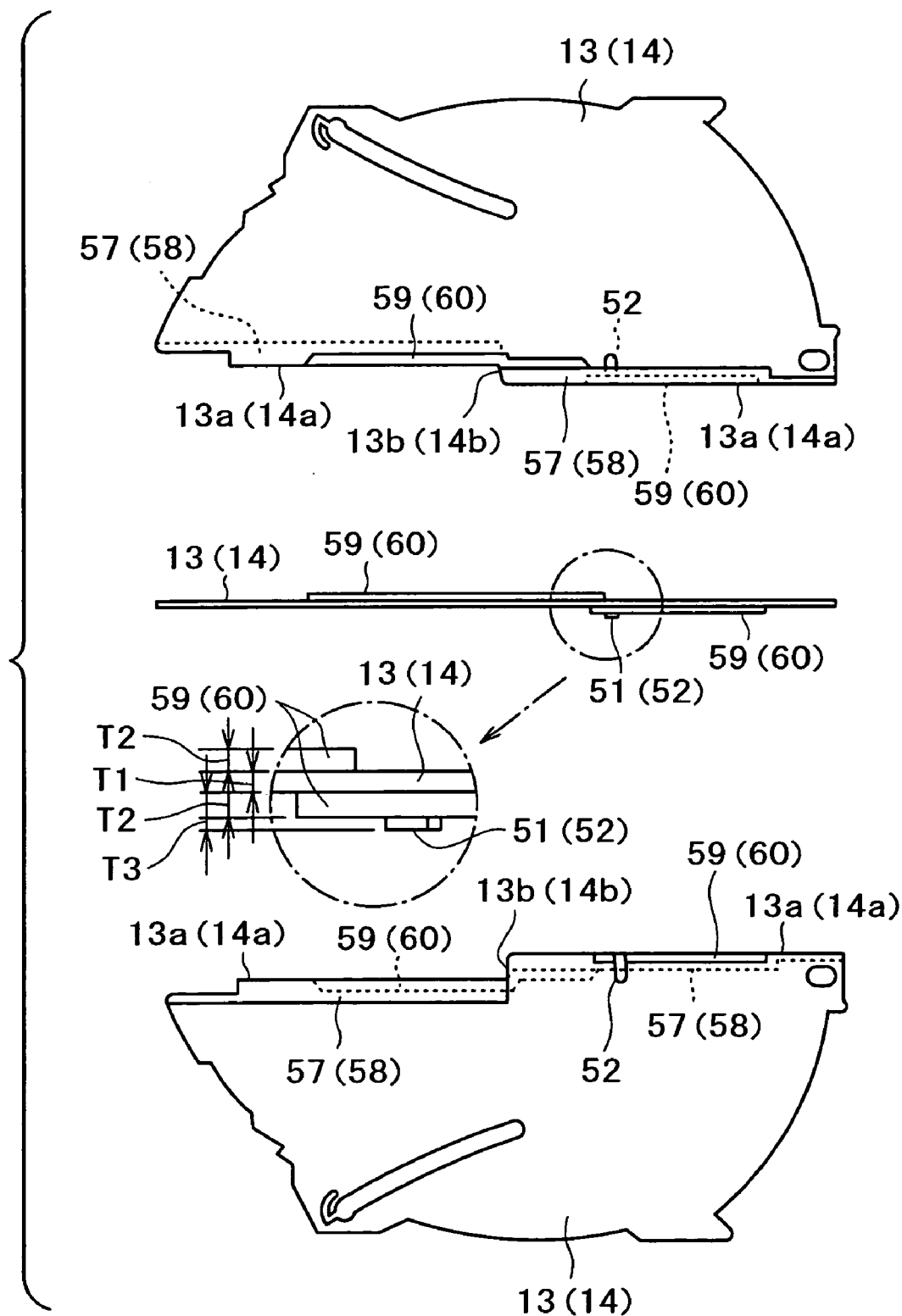
FIG. 12 shows the top, bottom, and side (partly enlarged) of the shutter of the same disc cartridge as shown above.
Figure 13:
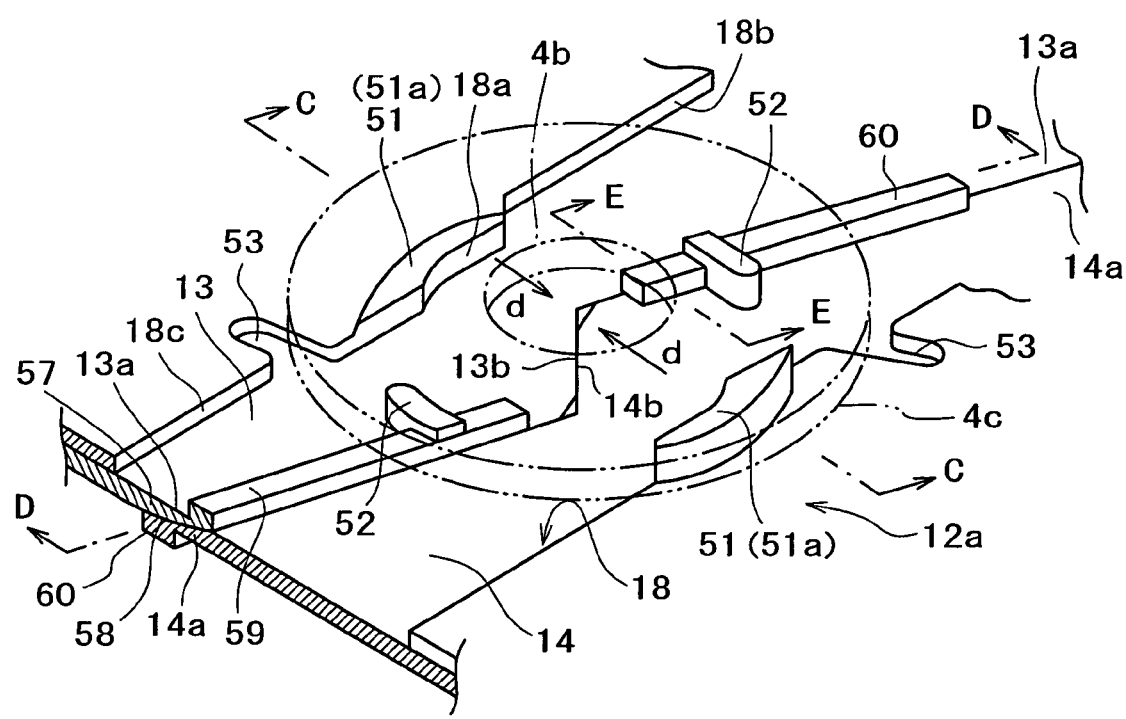
FIG. 13 is an enlarged sectional view showing the first and second disc mounts and the shutter reinforcing rib of the same disc cartridge as shown above. (The first embodiment)
Figure 16:
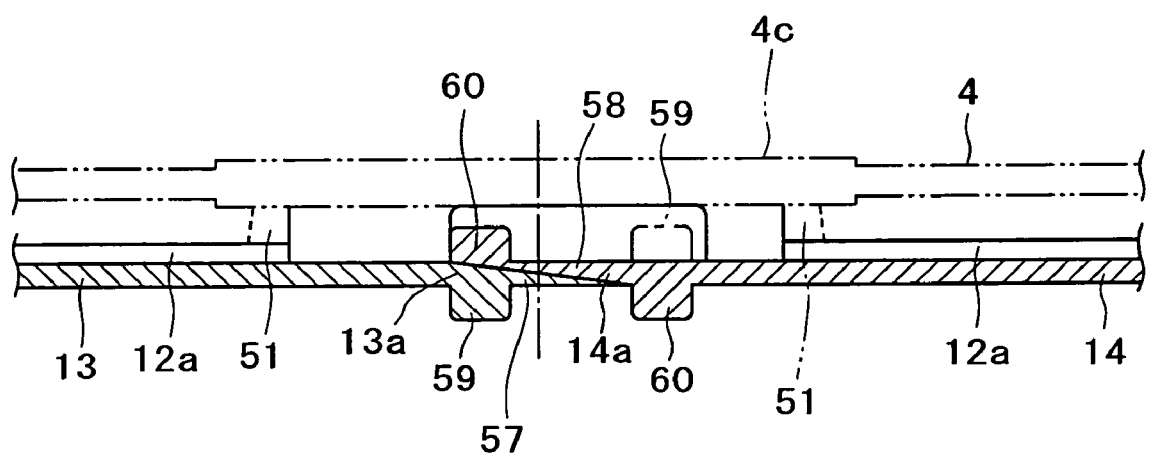
FIG. 16 is an enlarged sectional view taken in the direction of the arrows along the line E—E in FIG. 13.

So, at the position corresponding to the central position of the central opening 17a, the central parts 13b and 14b in the lengthwise direction of the contact edges 13a and 14a of the paired shutter members 13 and 14 are bent nearly like a crank, and a pair of slopes 57 and 58 are formed symmetrically in the opposite direction upward and downward at both sides of the central parts 13b and 14b at these paired contact edges 13a and 14a, as shown in FIGS. 12, 13, and 16.

And, as shown in FIGS. 3, 5, 7, 13 and 16, when the paired shutter members 13 and 14 are closed to each other in the direction of arrow d, the central parts 13b and 14b of the paired contact edges 13a and 14a are brought into close contact with each other (under light pressure) by the component of force in the direction of arrow d', and on the other hand, the symmetrical paired slopes 57 and 58 are brought into close contact (under light pressure) from above and under in the vertically opposite direction of the paired contact edges 13a and 14a, thereby these paired contact edges 13a and 14a overlap with each other from above and under at the parts of their slopes 57 and 58, so that the stiffness of these paired contact edges 13a and 14a is improved.

Moreover, the upper and lower paired shutter reinforcing ribs 59 and 60 are integrally formed along the face of the upper and lower opposite sides of the slopes 57 and 58 at both upper and lower faces (both internal and external faces) of the contact edges 13a and 14a of the paired shutter members 13 and 14, so that the stiffness of these paired contact edges 13a and 14a is improved.

At this time, the paired shutter members 13 and 14 are about 1.1 mm thick (T1) and the shutter reinforcing ribs 59 and 60 are about 0.8 mm thick (T2), as shown in FIG. 12. Also, the second disc mount members 52 mentioned above are integrally formed in a state of crossing on part of the other shutter reinforcing ribs 59 and 60 above the paired shutter members 13 and 14, and these second disc mount members 52 are about 0.9 mm thick (T3).

The shutter reinforcing ribs constructed as mentioned above according to the first embodiment are characterized in that when the paired shutter members 13 and 14 are closed to each other in the direction of arrow d from both sides of the bottom opening 17 and these paired contact edges 13a and 14a come into contact with each other in the direction of arrow d, the paired slopes 57 and 58 of these contact edges 13a and 14a tightly overlap with each other from above and under and the paired shutter reinforcing ribs 59 and 60 are arranged at the both upper and lower sides of the contact edges 13a and 14a in close contact with each other so that they overlap from above and under, and the paired shutter members 13 and 14 are reinforced from above and under to give high stiffness by these paired shutter reinforcing ribs 59 and 60, as shown in FIGS. 3, 7, 13 and 16.

Here, it is possible to improve the stiffness of these shutter members 13 and 14 alone by integrally forming the shutter reinforcing ribs 59 and 60 on the both upper and lower faces of the these shutter members 13 and 14 along the contact edges 13a and 14a of the paired shutter members 13 and 14. Moreover, when these shutter members 13 and 14 close in the direction of arrow d and these paired contact edges 13a and 14a come into contact with each other in the direction of arrow d, the upper and lower parts of the paired contact edges 13a and 14a are reinforced each other by the paired shutter reinforcing ribs 59 and 60. It follows, therefore, that the stiffness at the paired contact edges 13a and 14a as a whole is improved.

Therefore, the paired shutter members 13 and 14 which are reinforced to impart high rigidity hardly deflect up ward even though the index finger H2 is inadvertently inserted into the bottom opening 17, thereby either or both of the shutter members 13 and 14 of thin plate structure are pushed upward (in the direction of arrow i) by the index finger H2, when the disc cartridge 1, with its shutter closed, is loaded into or ejected from the optical drive unit by holing by the hand H1 from above and under, as indicated by the chain line shown in FIG. 9. Therefore, it is possible to prevent the accident by which the paired shutter members 13 and 14 easily deflect upward (in the direction of arrow i) and come into contact with the recording surface 4a of the optical disc 4, thereby damaging data.

Incidentally, the shutter reinforcing ribs 59 and 60 may also be integrally formed only on the upper surface (inside) or the lower surface (outside) of the contact edges 13a and 14a of the paired shutter members 13 and 14.

Also, the approximately groovelike notches 61 and 62 that permit the upper and lower paired shutter reinforcing ribs 59 and 60 integrally formed along the contact edges 13a and 14a of these paired shutter members 13 and 14 to escape when the paired shutter members 13 and 14 are opened in the direction of arrow c, are formed along both edges of the side openings 17b and 17c and 18b and 18c in the bottom opening 17 and the internal opening 18, as shown in FIGS. 4, 6, 11, and 13.

(5) The Shutter Reinforcing Rib of the Disc Cartridge, According to the Second Embodiment The disc cartridge 1 according to the second embodiment is characterized in that the paired shutter members 13 and 14 have a shutter reinforcing rib formed integrally therewith, as explained below with reference to FIGS. 17 and 18.

In this case, the disc cartridge 1 is of one-head type, which employs one optical pickup to perform recording/reading on the optical disc 4. The disc cartridge of this type is characterized in that the bottom opening 17 of the lower shell 3 and the internal opening 18 of the inner rotor 12 have a U-shape which consists of approximately semicircular central openings 17a and 18a and the side openings 17b and 18b extending from the end thereof.

The upper and lower paired shutter reinforcing ribs 59 and 60 are integrally formed along the contact edges 13a and 14a of the paired shutter members 13 and 14 at the corresponding positions in the side openings 17a and 18b of the bottom opening 17 and the internal opening 18. It has the same advantage as the above-mentioned shutter reinforcing ribs according to the first embodiment.

(6) The Conventional Disc Mount and Shutter of the Disc Cartridge, Which are Subject to Deflection The conventional disc mount and shutter (liable to deflection) are constructed as explained below with reference to FIGS. 23 and 24. The conventional disc mount shown there is the one which is suitable for the disc cartridge 1 of one-head type. The inner rotor 12 has the internal opening 18 formed on the bottom 12a thereof. The internal opening 18 takes on a U-shape which consists of the semicircular central opening 18a and the side opening 18b connecting thereto. The disc mount 51 is integrally formed in a semicircular shape above (inside) the bottom 12a of the inner rotor 12 and along the periphery of the central opening 18a.

On the top (inside) of the shutter members 13 and 14 is formed none of the disc mount, and one side part of the semicircular disc mount member 51 constitutes the open part 51b.

Therefore, when the central part 4c of the optical disc 4 is placed horizontally on this disc mount member 51, the open part 51b of the disc mount member 51 cannot support at all the central part 4c but merely supports the semicircular region of the central part 4c.

Consequently, as indicated by the chain line in FIG. 24, the optical disc 4 placed horizontally on the disc mount 51 is liable to incline downward (in the direction of arrow j) at the open part 51b of the disc mount member 51. This leads to the possibility that the recording surface 4a (facing downward) of the optical disc 4 comes into contact with the bottom 12a of the inner rotor 12, thereby causing damage to data.

The conventional shutter is liable to deflection because the shutter members 13 and 14 of thin plate structure do not have any shutter reinforcing ribs and the shutter members 13 and 14 are easily deflected by the external force. Therefore, as indicated by the chain line in FIGS. 9, 23, and 24, when the disc cartridge (with its shutter closed) is loaded into and ejected from the optical disc drive unit by holding it by the hand H1 (with fingers positioned up and down), the index finger H2 is inadvertently pushed into the bottom opening 17, and as indicated by the chain line in FIGS. 23 and 24, either or both of the shutter members 13 and 14 of thin plate structure are easily deflected and pushed in upward (in the direction of arrow i) by the index finger H2. This leads to the possibility that the shutter members 13 and 14 come into contact with the recording surface 14a (facing downward) of the optical disc 4, thereby causing damage to data.

Incidentally, at this time, the shutter members 13 and 14 are easily deflected and pushed upward in the direction of arrow i by the finger because those parts of the contact edges 13a and 14a which come into contact with each other when the shutter members 13 and 14 close to each other in the direction of arrow d are particularly weak in strength.

Nevertheless, the foregoing problems can be solved if the disc cartridge 1 is provided with the disc mount and shutter reinforcing ribs according to the first and second embodiments mentioned above.

(7) The Route Through Which Dust Enters from the Driving Window of the Inner Rotor of the Disc Cartridge The route through which dust enters from the driving window of the inner rotor of the disc cartridge is explained in the following with reference to FIGS. 3, 11, 19, and 20A and 20B.

Since the disc cartridge 1 is of two-head type as mentioned above, the bottom opening 17 is formed in a shape which crosses nearly straight the lower shell 3 in the direction from front to rear and the internal opening 18 is also formed in a shape which crosses nearly straight in the diametral direction of the bottom 12a of the inner rotor 12.

Therefore, when the inner rotor 12 rotates and returns in the direction of arrow b from the open position P2 to the close position P1 and the bottom opening 17 of the lower shell 3 is completely closed from the inside by the peripheral part of the bottom 12a of the inner rotor 12 and the paired shutter members 13 and 14, the rear side opening 18c, which is a part of the internal opening 18 closed by the bottom 12a of the inner rotor 12, is extremely close to the driving window 23 of the inner rotor which is opened in the side face 1b of the disc cartridge 1.

As the result, in the case of the disc cartridge 1, it is conceivable that there is a dust entering route 65 that permits dust contained in the open air to enter, together with the air, the lower gap 15 of the bottom 12a of the inner rotor 12 through the lower part of the rotation driven part 22 of the inner rotor 23 from the inner rotor driving window hole 23 and blow up from under into the inner rotor 12 through the peripheral part of the rear side opening 18c of the internal opening 18 of the inner rotor 12 from the gap 15, as indicated by the arrow j in FIGS. 3, 11, 19, and 20A and 20B.

And, the dust which has entered, as if blown up from under into inner rotor 12 through the dust entering route 65, easily sticks to the recording surface 4a (facing downward) of the optical disc 4 housed in the inner rotor 12.

If the disc cartridge 1 is loaded into the optical disc drive unit, with dust sticking to the recording surface 4a (facing downward) of the optical disc 4, and the optical disk undergoes data recording and reading, there will be errors in data recording and reading due to dust-induced spacing loss. This is a serious problem for the disc cartridge 1 of high-density recording type.

Figure 20B:
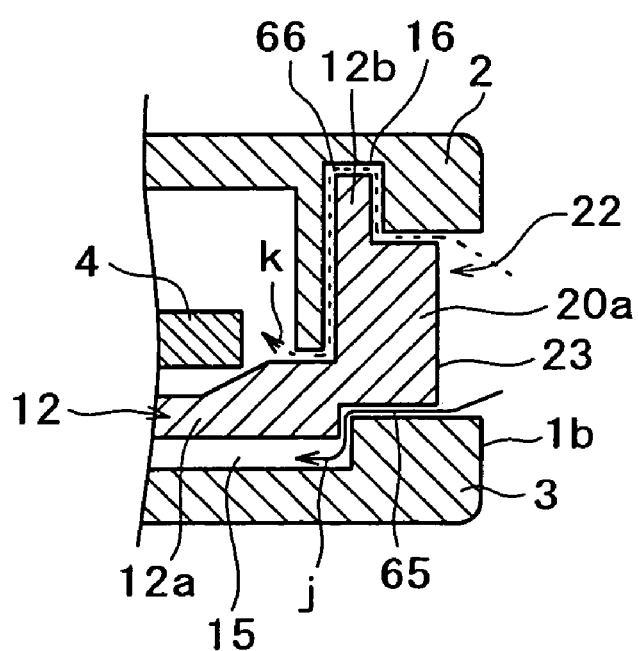
FIG. 20B is an enlarged sectional view of important parts taken in the direction of the arrows along the line F—F in FIGS. 11 and 19, which is intended to explain the route through which dust enters the inner rotor.
Figure 21A:
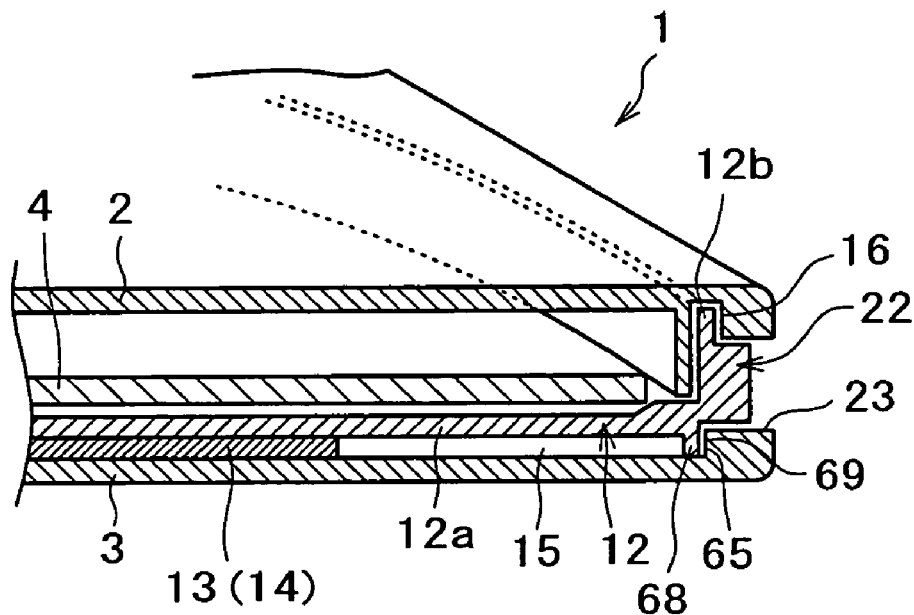
FIG. 21A is a sectional perspective view taken in the direction of the arrows along the line F—F in FIGS. 11 and 19, which is intended to explain the labyrinth packing arranged in the route through which dust enters the inner rotor. (The first embodiment)
Figure 21B:
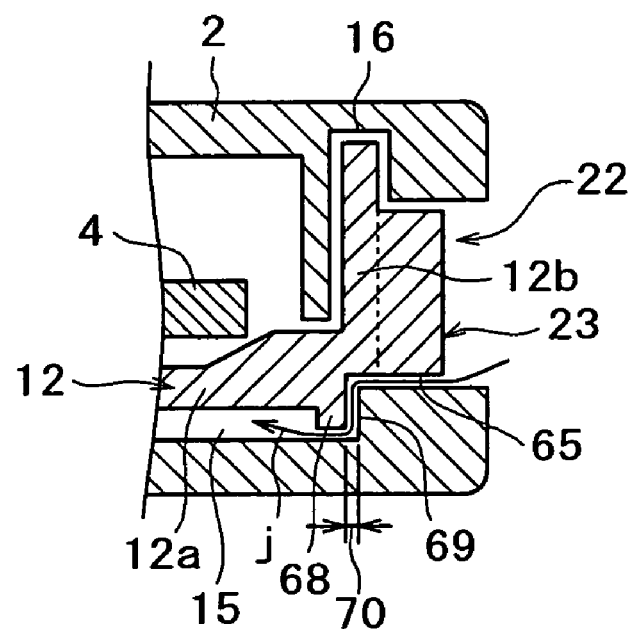
FIG. 21B is an enlarged sectional view of important parts taken in the direction of the arrows along the line F—F in FIGS. 11 and 19, which is intended to explain the labyrinth packing arranged in the route through which dust enters the inner rotor. (The first embodiment)

Incidentally, it is conceivable that there is the dust entering route 66 which permits dust to enter the inner rotor 12 through the cylindrical groove 16 of the upper shell 2 as if it takes a long way upward around the peripheral wall 12b of the inner rotor 12 from the rotation driving window 23 of the inner rotor of the disc cartridge 1, as indicated by the chain line in the direction of arrow k in FIG. 20B. This dust entering route 66 passes through the cylindrical groove 16 whose structure resembles that of a certain kind of labyrinth packing; therefore, dust tends to accumulate in this dust entering route 66. This greatly reduces the possibility of dust sticking to the recording surface 4a (facing downward) of the optical disc 4.

(8) The Labyrinth Packing Arranged in the Route Through Which Dust Enters from the Driving Window of the Inner Rotor of the Disc Cartridge, According to the First Embodiment A description is given below, with reference to FIGS. 3, 11, 19, and 21A and 21B, of the labyrinth packing 67 formed in the dust entering route 65 of the disc cartridge 1, according to the first embodiment.

The labyrinth packing 67 (according to the first embodiment) is an arced rib 68 which is integrally formed at the outermost circumferential position on the underside of the bottom 12a of the inner rotor 12, said position being concentric with and dislocated toward the direction of arrow b (or the direction in which the inner rotor 12 is closed) from the rear opening 18c of the internal opening 18. The arced rib 68 is formed such that its length in the circumferential direction is equal to or longer than the length of the rotation driving window 23 of the inner rotor. Moreover, it has the arced step surface 69 parallel to it, which is formed at the position which is inside the rotation driving window 23 of the inner rotor and at which the it falls down at a right angle into the above-mentioned gap 15 of the lower shell 3 from the window 23.

When the inner rotor 12 turns (in the direction of arrow b) to the close position P1 so that the bottom opening 17 is completely closed, the arced rib 68 of the inner rotor 12 opposes parallel to the inside of the arced step surface 69 of the lower shell 3 and the gap between the arced rib 68 and the arced step surface 69 becomes the minute gap 70, as shown in FIGS. 3, 11, 19, and 21A and 21B.

The labyrinth packing 67 constructed as mentioned above functions in the following manner. When the bottom opening 17 of the disc cartridge 1 is completely closed with the inner rotor 12 and the paired shutter members 13 and 14, the labyrinth packing 67 form the minute gap 70 in the dust entering route 65. As the dust entering together with the air from the rotation driving window 23 of the inner rotor passes through the minute gap 70 in the direction of arrow j, dust is separated from the air and captured in the gap 15 (for separation and accumulation) by the principle of the labyrinth packing that the air is temporarily compressed (with a pressure rise) and then rapidly expanded (with a pressure decrease and an energy loss) as soon as it enters the gap 15 from the minute gap 70.

The foregoing provision imparts a high degree of dust-proofness to the disc cartridge 1, because it prevents dust from entering together with the air from the gap 15 through the rear opening 18c of the inside opening 18 of the inner rotor 12 and then blowing up from under into the inner rotor 12, thereby sticking to the recording surface 4a (facing downward) of the optical disc 4.

Figure 22A:
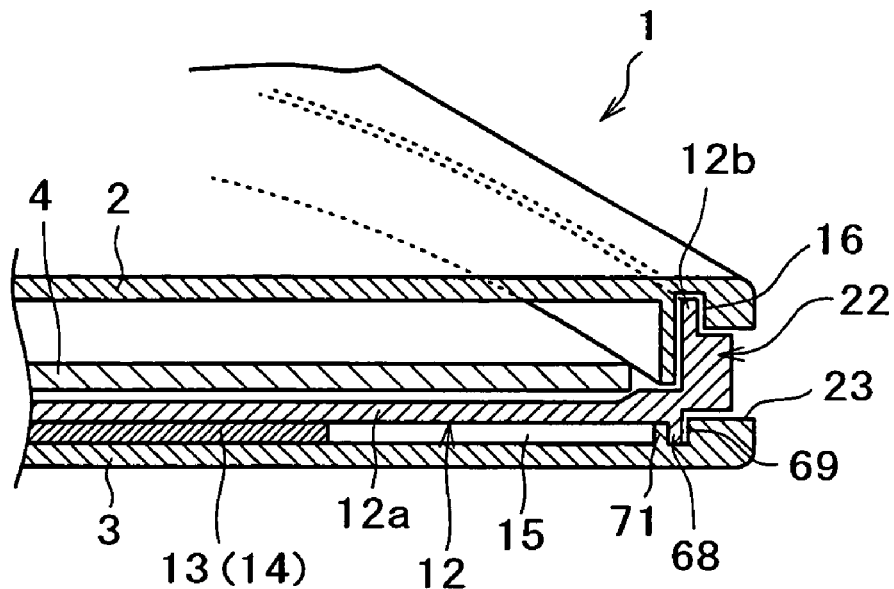
FIG. 22A is a sectional perspective view taken in the direction of the arrows along the line F—F in FIGS. 11 and 19, which is intended to explain the labyrinth packing. (The second embodiment)
Figure 22B:
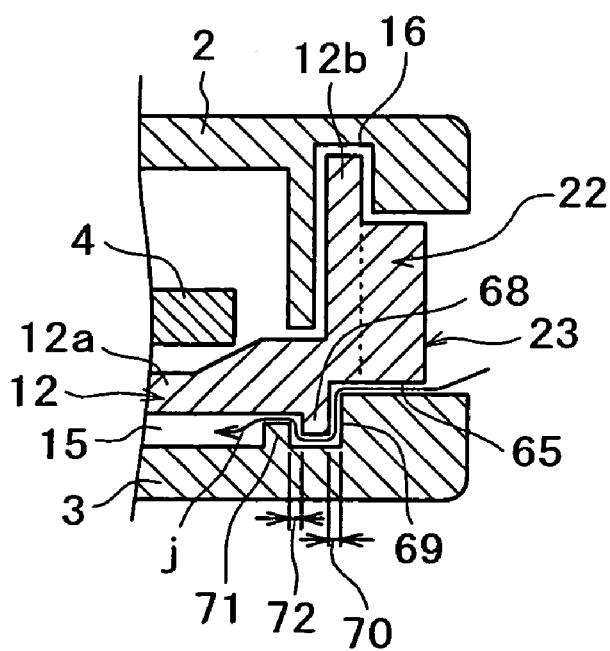
FIG. 22B is an enlarged sectional view of important parts taken in the direction of the arrows along the line F—F in FIGS. 11 and 19, which is intended to explain the labyrinth packing. (The second embodiment)

(9) The Labyrinth Packing Arranged in the Route Through Which Dust Enters from the Driving Window of the Inner Rotor of the Disc Cartridge, According to the Second Embodiment A description is given below, with reference to FIGS. 22A and 22B, of the labyrinth packing 67 formed in the above-mentioned dust entering route 65 of the disc cartridge 1, according to the second embodiment.

The labyrinth packing 67 (according to the second embodiment) is an arced rib 71 which is integrally formed parallel to the arced step surface 69 at the position which is in the gap 15 of the lower shell 3 and inside the arced step surface 69. It is constructed such that when the inner rotor 12 turns (in the direction of arrow b) to the close position P1, the arced rib 68 which is integrally formed on the underside of the bottom 12a of the inner rotor 12 is inserted between the arced step surface 69 of the lower shell 3 and the arced rib 71, so that the minute gap 70 is formed between the arced rib 68 and the arced step surface 69, and at the same time, the minute gap 72 is formed also between the arced rib 68 and the arced rib 71.

The labyrinth packing 67 according to the second embodiment functions in the following manner. When the dust entering together with the air from the rotation driving window 23 of the inner rotor passes through the two minute gaps 70 and 72, which constitute the labyrinth packing 67, the air undergoes compression and expansion twice. This improves the effect of separating dust from the air.

While preferred embodiments have been described, they are not intended to restrict the scope of the present invention. Obviously many modifications and variations of the present invention are possible in the light of the technical idea of the present invention.

For example, the present invention may be applied to the disc cartridge of caddy type which permits the disc 4 to be exchangeably (removably) housed in the inner rotor 12. In this case, the upper shell is constructed such that it totally or partly opens and closes for the lower shell 3.

Also, the present invention can be applied to a variety of disc cartridges to house optical discs (such as MO and DVD) and other disc-like recording media for recording and reading in various ways.

What is claimed is:

1. A disc cartridge to rotatably house a disc-like recording medium, said disc cartridge comprising:
   a shutter to open and close a bottom opening of the disc cartridge;
   a first disc mount formed inside a periphery of said bottom opening and on which is placed horizontally a part of a circumference of a substantially central part of said disc-like recording medium; and
   a second disc mount formed inside said shutter and on which is placed horizontally an other part of the circumference of the central part of said disc-like recording medium within said bottom opening when the shutter closes said bottom opening.

2. A disc cartridge comprising:
   an upper shell;
   a lower shell attached to said upper shell and having a bottom opening;
   an inner rotor rotatably housing therein a disc-like recording medium and being rotatably arranged between said upper and lower shells and having an internal opening that lies on an inside of said bottom opening when it is turned from a close position to an open position;
   a shutter that opens and closes said bottom opening in conjunction with said inner rotor as said inner rotor is rotated between the close position and the open position;
   a first disc mount formed at the bottom of said inner rotor in a vicinity of said internal opening and on which is placed horizontally a part of a circumference of a central part of said disc-like recording medium; and a second disc mount formed inside said shutter and on which is placed horizontally an other part of the central part of said disc-like recording medium when said shutter closes said bottom opening.

3. The disc cartridge as defined in claim 2 wherein said second disc mount of said shutter is substantially concentric with said first disc mount of said inner rotor within said bottom opening when said shutter moves from the open position to the close position.

4. The disc cartridge as defined in claim 2 wherein said shutter is arranged between said lower shell and said inner rotor, and when said shutter moves from the close position to the open position, said second disc mount of said shutter is housed in a notch formed in an edge of said internal opening of said inner rotor.

5. The disc cartridge as defined in claim 2, wherein said bottom opening and said internal opening respectively have the central opening and paired side openings connecting to both sides thereof, and said shutter comprises paired shutter members, a pair of first disc mount members constituting said first disc mount are formed on both sides of said central opening at said internal opening of said inner rotor, a pair of second disc mount members constituting said second disc mount are formed respectively on said paired shutter members, and said second disc mount members formed on said paired shutter members are substantially concentric between said paired first disc mount members within said bottom opening when said paired shutter members close said bottom opening.

6. A disc cartridge comprising:
an upper shell;
a lower shell attached to said upper shell and having a bottom opening;
an inner rotor for housing therein a disc-like recording medium and being rotatably housed between said upper and lower shells and having an internal opening that lies on said bottom opening when said inner rotor rotates from a close position to an open position;
a shutter arranged between said inner rotor and said lower shell and that opens and closes said bottom opening as said inner rotor rotates between the close position and the open position; and
a rotation driving part formed on a periphery of said inner rotor and being driven for rotation by a driving member from outside of said upper and lower shells, wherein said upper and lower shells have an inner rotor rotation driving window open to a side face of said upper and lower shells so that a part of said rotation driving part is exposed to the outside from the side face of said upper and lower shells so that said rotation driving part is rotated and driven by said driving member, and having a labyrinth packing in a route through which dust enters from said inner rotor rotation driving window through a gap between a bottom of said inner rotor and said lower shell and an internal opening of said inner rotor.

7. The disc cartridge as defined in claim 6, wherein said labyrinth packing is formed by an arced rib formed at a part of the lower periphery of the bottom of said inner rotor and in a vicinity of said internal opening and a minute gap formed between said arced rib and said lower shell inside said lower shell.

8. The disc cartridge as defined in claim 6, wherein said bottom opening and said internal opening respectively have a central opening and paired side openings connecting to both sides thereof.

9. A disc cartridge to rotatably house a disc-like recording medium, comprising:
a shell with an opening; and
paired shutter members to open and close said opening from both sides, said paired shutter members having a shutter reinforcing rib along a contact edge at which said paired shutter members come into contact with each other in said opening when said paired shutter members close said opening from both sides.

10. A disc cartridge comprising: an upper shell;
a lower shell with a bottom opening and being attached to said upper shell;
an inner rotor for housing therein a disc-like recording medium and being rotatably arranged between said upper and lower shells; and
paired shutter members to open and close said bottom opening from both sides by rotation of said inner rotor, said paired shutter members having a shutter reinforcing rib along a contact edge at which said paired shutter members come into contact with each other in said bottom opening when said paired shutter members close said bottom opening from both sides.

11. The disc cartridge as defined in claim 10, in which said shutter reinforcing rib is formed along at least one of an inside surface and an outside surface of said paired shutter members.

12. The disc cartridge as defined in claim 10, in which the contact edge of one of said paired shutter members lies on top of the other of said paired shutter members by a sloped surface when said paired shutter members close said opening from both sides.

13. The disc cartridge as defined in claim 10, in which said shutter reinforcing rib formed in said paired shutter members is housed in a notch formed in both edges of said bottom opening when said paired shutter members move from the close position to the open position.

* * * * *